United States Patent
Wei et al.

(10) Patent No.: US 12,368,851 B2
(45) Date of Patent: Jul. 22, 2025

(54) PICTURE DECODING METHOD, PICTURE CODING METHOD AND CORRESPONDING APPARATUS

(71) Applicant: HANGZHOU HIKVISION DIGITAL TECHNOLOGY CO., LTD., Hnagzhou (CN)

(72) Inventors: Liang Wei, Hangzhou (CN); Fangdong Chen, Hangzhou (CN); Li Wang, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/730,716

(22) PCT Filed: Jan. 17, 2023

(86) PCT No.: PCT/CN2023/072549
§ 371 (c)(1),
(2) Date: Jul. 19, 2024

(87) PCT Pub. No.: WO2023/138562
PCT Pub. Date: Jul. 27, 2023

(65) Prior Publication Data
US 2025/0142067 A1    May 1, 2025

(30) Foreign Application Priority Data
Jan. 19, 2022  (CN) .................. 202210062756.3

(51) Int. Cl.
H04N 11/02    (2006.01)
H04N 19/124   (2014.01)
(Continued)

(52) U.S. Cl.
CPC ......... *H04N 19/124* (2014.11); *H04N 19/159* (2014.11); *H04N 19/176* (2014.11)

(58) Field of Classification Search
CPC ... H04N 19/124; H04N 19/159; H04N 19/176
(Continued)

(56) References Cited

U.S. PATENT DOCUMENTS 5,594,679 A    1/1997 Iwata
2008/0226183 A1 9/2008 Lei et al.
(Continued)

FOREIGN PATENT DOCUMENTS

CN    107079172 A    8/2017
CN    112235568 A    1/2021
(Continued)

OTHER PUBLICATIONS

International Search Report in International Appln. No. PCT/CN2023/072549, mailed on May 8, 2023, 4 pages (with English translation).
(Continued)

*Primary Examiner* — Jayanti K Patel
*Assistant Examiner* — Richard B Carter
(74) *Attorney, Agent, or Firm* — Fish & Richardson P.C.

(57) ABSTRACT

Embodiments of the present disclosure relate to the field of video coding and decoding, and provide a picture decoding method, a picture coding method, and corresponding apparatuses. According to an example of the picture decoding method, a quantization parameter (QP) value of at least one pixel point is determined for any at least one pixel point indicating one pixel point or a plurality of parallel dequantized pixel points in the current coding block, the QP values of at least two pixel points among pixel points in the current coding block being different. The at least one pixel point is then dequantized according to the QP value of the at least one pixel point. The QP value of each pixel point is
(Continued)

determined for the coding block; therefore, each pixel point can be dequantized according to the QP value of each pixel point.

17 Claims, 12 Drawing Sheets

(51) Int. Cl.
*H04N 19/159* (2014.01)
*H04N 19/176* (2014.01)

(58) Field of Classification Search
USPC ................................. 375/240.12, E7.076
See application file for complete search history.

(56) References Cited

U.S. PATENT DOCUMENTS

| | | | |
|---|---|---|---|
| 2010/0220792 A1* | 9/2010 | Kamito | H04N 19/176 |
| | | | 375/E7.076 |
| 2015/0146776 A1 | 5/2015 | Koyama et al. | |
| 2015/0365671 A1 | 12/2015 | Pu et al. | |
| 2016/0277761 A1 | 9/2016 | Li et al. | |
| 2017/0332090 A1* | 11/2017 | Furihata | H04N 19/136 |
| 2018/0063544 A1 | 3/2018 | Tourapis et al. | |
| 2019/0206092 A1* | 7/2019 | Wee | H04N 19/14 |
| 2021/0329285 A1* | 10/2021 | Yonezawa | H04N 19/23 |

FOREIGN PATENT DOCUMENTS

| | | |
|---|---|---|
| CN | 113497937 A | 10/2021 |
| JP | H06-292178 A | 10/1994 |
| JP | 2019-114868 A | 7/2019 |
| JP | 2019-528651 A | 10/2019 |
| JP | 2019-201288 A | 11/2019 |
| KR | 20190022629 A | 3/2019 |
| KR | 20190054182 A | 5/2019 |

OTHER PUBLICATIONS

Notice of Allowance in Taiwanese Appln. No. 112102375, mailed on May 21, 2024, 5 pages (with English translation).
Office Action in Japanese Appln. No. 2024-543258, mailed on Dec. 9, 2024, 22 pages (with machine translation).
Office Action in Korean Appln. No. 10-2024-7027545, mailed on Dec. 3, 2024, 10 pages (with machine translation).

* cited by examiner

■ Current pixel point

▨ Surrounding pixel point 1

▨ Surrounding pixel point 2

PICTURE DECODING METHOD, PICTURE CODING METHOD AND CORRESPONDING APPARATUS

CROSS-REFERENCE TO RELATED APPLICATION

The present application is a U.S. National Stage of International Application No. PCT/CN2023/072549, filed on Jan. 17, 2023, which claims the benefit of priority to Chinese Application No. 202210062756.3, filed on Jan. 19, 2022, the contents of all of which are incorporated by reference herein in their entireties for all purposes.

TECHNICAL FIELD

Embodiments of the present disclosure relate to video coding and decoding, and in particular to picture decoding methods, picture coding methods and corresponding apparatuses.

BACKGROUND

In the field of video coding and decoding, video compression (i.e., video coding and decoding) technology can compress data amount of a video, thus realizing efficient transmission or storage of the video.

Coding and decoding a video means coding and decoding every frame of picture in the video. Taking a frame of picture as an example, at a coding side, a picture coder codes the picture to obtain a bit stream corresponding to the picture and transmits the bit stream to a decoding side. At the decoding side, the picture decoder parses the bit stream to obtain a picture. At present, the picture is partitioned into one or more coding units (CU), and a picture coder predicts each CU, determines a residual value between a prediction value of CU and a true value of CU, and sequentially transforms, quantizes and codes the residual value, thus obtaining the bit stream. Correspondingly, the picture decoder predicts each CU, performs dequantization and inverse transformation on a decoding result of the corresponding bit stream of the CU to obtain the residual value corresponding to the CU, calculates a sum of the prediction value and the residual value of CU, thus obtaining a reconstructed value of CU.

In the process of picture coding and decoding, quantization can realize the many-to-one mapping of signal values, thus effectively reducing signal value space and obtaining better compression effect. It can be understood that the coding side and the decoding side perform quantization and dequantization processes according to one or more quantization parameters (QP). Currently, a QP is set for a CU, and the coding side acquires the QP of each CU and quantizes the residual value or transform coefficients of the CU based on this QP. Accordingly, the decoding side acquires the QP of the CU and performs dequantization of the quantized coefficients parsed from the bit stream based on this QP. However, using the same QP to quantize all pixel points in a CU, that is, quantizing all pixel points in the CU to the same extent, will lead to quantization distortion in the picture coding and decoding process (picture distortion caused by quantization) larger.

SUMMARY

Embodiments of the present disclosure provide picture decoding methods, coding methods, and apparatuses that can reduce a decoding distortion of a picture frame while ensuring a certain compression rate, and can improve the authenticity and accuracy of picture decoding. In order to achieve the above purpose, the embodiments of the present disclosure adopt the following technical solution.

In a first aspect, an embodiment of the present disclosure provides a picture decoding method, which is performed by a decoding side, and the method includes: determining, for any at least one pixel point which indicates one pixel point or a plurality of parallel dequantized pixel points in a current coding block, a quantization parameter (QP) value for the at least one pixel point, where at least two pixel points in the current coding block are of different QP values; and performing dequantization on the at least one pixel point according to the QP value of the at least one pixel point.

Through the decoding method provided in the embodiment of the present disclosure, the video decoder can determine the QP value of each pixel point for the coding block, so that each pixel point can be dequantized according to the QP value of each pixel point, that is, dequantization is performed pixel point by pixel point. In this way, the decoding distortion of picture frames can be reduced and the authenticity and accuracy of picture decoding can be improved under the condition of ensuring a certain compression rate.

In a possible implementation, the picture decoding method provided by embodiments of the present disclosure further includes: acquiring a QP value of the current coding block; and taking the QP value of the current coding block as a prediction QP value of the at least one pixel point.

In a possible implementation, determining a QP value of the at least one pixel point includes: when the at least one pixel point indicates any one target pixel point or any plurality of parallel dequantized target pixel points in the current coding block, adjusting the prediction QP value of the at least one pixel point, and taking the adjusted prediction QP value as the QP value of the at least one pixel point.

In a possible implementation, adjusting the prediction QP value of the at least one pixel point includes: acquiring information of reconstructed pixel points surrounding the at least one pixel point; and adjusting the prediction QP value of the at least one pixel point according to the information of the reconstructed pixel points surrounding the at least one pixel point.

In a possible implementation, adjusting the prediction QP value of the at least one pixel point includes: if the at least one pixel point satisfies a first preset condition, taking a preset QP value as the QP value of the at least one pixel point; otherwise, taking the prediction QP value of the at least one pixel point as the QP value of the at least one pixel point.

The first preset condition includes at least one of: the at least one pixel point is a luma pixel point; the at least one pixel point is a chroma pixel point; a bit depth of the at least one pixel point is less than or equal to a bit depth threshold; the prediction QP value of the at least one pixel point is less than or equal to an adjustable QP maximum value, and the adjustable QP maximum value is less than or equal to a QP maximum value; or the information of the reconstructed pixel points surrounding the at least one pixel point is less than or equal to a first preset threshold.

In a possible implementation, performing dequantization on the at least one pixel point according to the QP value of the at least one pixel point includes: performing dequantization on the at least one pixel point according to the adjusted prediction QP value.

In a possible implementation, the target pixel point indicates any one or more pixel points in the current coding block.

In a possible implementation, the current coding block at least includes at least one of first part pixel points and second part pixel points, the target pixel point indicates any one or more pixel points in the second part pixel points.

In a possible implementation, the target pixel point indicates any one or more pixel points among first position pixel points in the second part pixel points.

The target pixel point indicates any one or more pixel points among second position pixel points in the second part pixel points.

In a possible implementation, a prediction mode of the current coding block is a pixel-wise prediction mode, the current coding block at least includes at least one of first part pixel points and second part pixel points, the second part pixel points include at least one of first position pixel points and second position pixel points, and the first position pixel points, the second position pixel points are determined according to the pixel-wise prediction mode of the current coding block.

In a possible implementation, adjusting the prediction QP value of the at least one pixel point according to the information of the reconstructed pixel points surrounding the at least one pixel points includes: if the at least one pixel point satisfies a second preset condition and a third preset condition, adjusting the prediction QP value of the at least one pixel point according to a first QP offset and a distortion reference QP value, where the distortion reference QP value represents a QP value corresponding to a just noticeable distortion, where, the second preset condition includes the prediction QP value of the at least one pixel point being greater than the distortion reference QP value, and the prediction QP value of the at least one pixel point being less than or equal to an adjustable QP maximum value, the third preset condition includes the information of the reconstructed pixel points surrounding the at least one pixel point being less than or equal to a first threshold; if the at least one pixel point does not satisfy the second preset condition, or the at least one pixel point satisfies the second preset condition but does not satisfy the third preset condition and a fourth preset condition, taking the prediction QP value of the at least one pixel point as the QP value of the at least one pixel point, where the fourth preset condition includes the information of the reconstructed pixel points surrounding the at least one pixel point being greater than a second threshold, and the first threshold being less than or equal to the second threshold.

In a possible implementation, when the at least one pixel point satisfies the second preset condition and the third preset condition, the adjusted prediction QP value satisfies: finalQP=max (initQP−offset1, jndQP), where finalQP represents the adjusted prediction QP value, initQP represents the prediction QP value of the at least one pixel point, offset1 represents the first QP offset, jndQP represents the distortion reference QP value, and max represents taking a maximum value.

In a possible implementation, the reconstructed pixel points surrounding the at least one pixel point include pixel points satisfying following conditions: pixel points in a square region with the at least one pixel point as a center and a side length being a first preset value; or, pixel points in a diamond-shaped region with the at least one pixel point as a center and a diagonal length being a second preset value.

In a possible implementation, the information of the reconstructed pixel points surrounding the current pixel point includes at least one of following information: pixel value, reconstruction residual value, gradient value, flatness information or texture information or complexity information, background luminance, contrast or degree of motion of the reconstructed pixel point. The reconstruction residual value includes a residual value after dequantization, or a difference between the reconstruction value and the prediction value. The gradient value includes horizontal gradient, vertical gradient, or average gradient.

In a possible implementation, a value of the information of the reconstructed pixel points includes at least one of: original value, absolute value, mean value or difference value.

In a possible implementation, acquiring information of reconstructed pixel points surrounding the at least one pixel point includes: acquiring information of a prediction pixel point of the at least one pixel point; if the prediction pixel point is not a reconstructed pixel point in the current coding block, taking a difference or an absolute value of the difference between the information of the prediction pixel point and information of reconstructed pixel points surrounding the prediction pixel point as the information of the reconstructed pixel points surrounding the at least one pixel point.

In a possible implementation, the prediction mode of the current coding block is a block prediction mode, and the picture decoding method provided by embodiments of the present disclosure further includes: acquiring region partition information of the current coding block, where the region partition information includes a number of regions N and position information of region boundary line, and N is an integer greater than or equal to 2; and partitioning the current coding block into N regions according to the region partition information.

In a possible implementation, acquiring region partition information of the current coding block includes: acquiring predefined region partition information of the current coding block; or, parsing a bit stream to acquire the region partition information of the current coding block.

In a second aspect, an embodiment of the present disclosure provides a picture coding method, which is performed by a coding side, and the method includes: determining, for any at least one pixel point which indicates one pixel point or a plurality of parallel quantization pixel points in a current coding block; a quantization parameter (QP) value for the at least one pixel point, where at least two pixel points in the current coding block are of different QP values; and performing quantization on the at least one pixel point according to the QP value of the at least one pixel point.

Through the coding method provided in the embodiment of the present disclosure, the video encoder can determine the QP value of each pixel point for the coding block, so that each pixel point can be quantized according to the QP value of each pixel point, that is, quantization is performed pixel point by pixel point. In this way, the decoding distortion of picture frames can be reduced and the authenticity and accuracy of picture decoding can be improved under the condition of ensuring a certain compression rate.

It can be understood that various possible implementations in the picture coding method can refer to the description of various possible implementations in the picture decoding method.

In a third aspect, an embodiment of the present disclosure provides a picture decoding apparatus, which is applied to a decoding side, and includes various modules for implementing the method described in the first aspect and one of its possible implementations, such as a quantization parameter (QP) determining unit and a dequantization unit.

For the technical solutions and beneficial effects of the third aspect, please refer to the description of any one of the first aspect and its possible implementation methods, and will not be described again here. The decoding apparatus has a function of realizing the behavior in the method example of the first aspect and any one of its possible implementations. The functions can be realized by hardware, or by hardware executing corresponding software. The hardware or software includes one or more modules corresponding to the above functions.

In a fourth aspect, an embodiment of the present disclosure provides a picture coding apparatus, which is applied to a coding side, and includes various modules for implementing the method described in the second aspect and one of its possible implementations, such as a quantization parameter (QP) determining unit and a quantization unit.

For the technical solutions and beneficial effects of the fourth aspect, please refer to the description of any one of the second aspect and its possible implementation methods, and will not be described again here. The coding apparatus has a function of realizing the behavior in the method example of the second aspect and any one of its possible implementations. The functions can be realized by hardware, or by hardware executing corresponding software. The hardware or software includes one or more modules corresponding to the above functions.

In a fifth aspect, an embodiment of the present disclosure provides an electronic device, including a processor and a memory, the memory is configured to store computer instructions, and the processor is configured to call and run the computer instructions from the memory to realize the method described in any one of the first to second aspects and possible implementations thereof. For example, the electronic device may refer to a video encoder, or a coding side including a video encoder. As another example, the electronic device may refer to a video decoder, or a decoding side including a video decoder.

In a sixth aspect, an embodiment of the present disclosure provides a computer-readable storage medium, in which a computer program or instruction is stored, and when the computer program or instruction is executed by a computing device or a storage system where the computing device is located, the method of any one of the first to second aspects and possible implementations thereof can be realized.

In a seventh aspect, an embodiment of the present disclosure provides a computer program product, which includes instructions, and when the computer program product is run on a computing device or a processor, the computing device or the processor is caused to execute the instructions, so as to realize the method of any one of the first to second aspects and possible implementations thereof.

In an eighth aspect, an embodiment of the present disclosure provides a chip, including a processor and a memory, the memory is configured to store computer instructions, and the processor is configured to call and run the computer instructions from the memory to realize the method described in any one of the first to second aspects and possible implementations thereof.

In a ninth aspect, an embodiment of the present disclosure provides a video codecing system, which includes a coding side and a decoding side, where the decoding side is configured to realize the method described in any one of the first aspect and its possible implementations, and the coding side is configured to realize the method described in any one of the second aspect and its possible implementations.

In a tenth aspect, an embodiment of the present disclosure provides a picture decoding method, which is performed by a decoding side, and the method includes: determining, for any at least one pixel point which indicates one pixel point or a plurality of parallel dequantized pixel points in a current coding block, a quantization parameter (QP) value for the at least one pixel point, where at least two pixel points in the current coding block are of different QP values; determining a quantization step Qstep of the at least one pixel point according to the QP value of the at least one pixel point; and for a selected quantizer combination, performing dequantization on a level of the at least one pixel point with the Qstep of the at least one pixel point.

In a possible implementation, the quantizer combination includes one or more quantizers which are uniform quantizers or non-uniform quantizers, and the level of the at least one pixel point is obtained by parsing a bit stream.

In a possible implementation, determining a quantization step Qstep of the at least one pixel point according to the QP value of the at least one pixel point includes: determining the Qstep by at least one way of formula derivation or table lookup according to the QP value of the at least one pixel point.

In a possible implementation, determining the Qstep by at least one way of formula derivation or table lookup includes: Qstep=a×QP+b, where a and b are preset parameters; or $Q_{step}=2^T$, where T is an integer related to QP; or Qstep=$2^{(QP+offset)/octave}$, where octave is an octave of QP, and offset is an integer offset value.

In a possible implementation, a dequantization formula of the uniform quantizer includes: c'=l*Qstep, $$l = \text{sign}(c) * \text{floor}\left(\frac{|c|}{Qstep} + f\right),$$

where l is a level obtained after quantization, and c is a to-be-quantized residual coefficient, f is a parameter for controlling rounding, f∈0,1), sign represents a sign function, floor represents a downward rounding function, and c' is a dequantized value.

In a possible implementation, f is 0.5 or other fixed value; or, f is adaptively determined according to the QP value, prediction mode and whether to transform or not.

In an eleventh aspect, an embodiment of the present disclosure provides a picture coding method, which is performed by a coding side, and the method includes: determining, for any at least one pixel point which indicates one pixel point or a plurality of parallel quantization pixel points in a current coding block; a quantization parameter (QP) value for the at least one pixel point, where at least two pixel points in the current coding block are of different QP values; determining a quantization step Qstep of the at least one pixel point according to the QP value of the at least one pixel point; and for a selected quantizer combination, performing quantization on the at least one pixel point with the Qstep of the at least one pixel point.

In a twelfth aspect, an embodiment of the present disclosure provides a picture decoding apparatus, and the decoding apparatus includes: a quantization parameter (QP) determining unit and a dequantization unit; the QP determining unit is configured to determine, for any at least one pixel point which indicates one pixel point or a plurality of parallel dequantized pixel points in a current coding block, a quantization parameter (QP) value for the at least one pixel point, where at least two pixel points in the current coding block are of different QP values; the QP determining unit is further configured to determine a quantization step Qstep of the at least one pixel point according to the QP value of the at least one pixel point; and the dequantization unit is configured to: for a selected quantizer combination, perform dequantization on a level of the at least one pixel point with the Qstep of the at least one pixel point.

In a thirteenth aspect, an embodiment of the present disclosure provides a picture coding apparatus, and the coding apparatus includes: a quantization parameter (QP) determining unit and a quantization unit; the QP determining unit is configured to determine, for any at least one pixel point which indicates one pixel point or a plurality of parallel quantization pixel points in a current coding block; a quantization parameter (QP) value for the at least one pixel point, where at least two pixel points in the current coding block are of different QP values; the QP determining unit is further configured to determine a quantization step Qstep of the at least one pixel point according to the QP value of the at least one pixel point; and the quantization unit is configured to: for a selected quantizer combination, perform quantization on the at least one pixel point with the Qstep of the at least one pixel point.

In a fourteenth aspect, an embodiment of the present disclosure provides a video codecing system, which includes a coding side and a decoding side, where the decoding side is configured to realize the method described in any one of the tenth aspect and its possible implementations, and the coding side is configured to realize the method described in the eleventh aspect.

In a fifteenth aspect, an embodiment of the present disclosure provides an electronic device, including a processor and a memory, the memory is configured to store computer instructions, and the processor is configured to call and run the computer instructions from the memory to realize the method described in any one of the tenth to eleventh aspects and possible implementations thereof.

In a sixteenth aspect, an embodiment of the present disclosure provides a computer-readable storage medium, in which a computer program or instruction is stored, and when the computer program or instruction is executed by a computing device or a storage system where the computing device is located, the method of any one of the tenth to eleventh aspects and possible implementations thereof can be realized.

In a seventeenth aspect, an embodiment of the present disclosure provides a picture decoding method, which is performed by a decoding side, and the method includes: if a prediction mode of a current coding block is an intra block copy prediction mode, partitioning the current coding block into a plurality of transform blocks (TB) and a plurality of prediction blocks (PB); starting from a second TB of the current coding block, allowing to refer reconstructed pixel values of a reconstructed TB on a left side of a current TB when performing motion compensation for PBs in each TB.

In a possible implementation, a size of the current coding block is 16×2, a size of the TB is 8×2, and a size of the PB is 2×2.

In a possible implementation, where partitioning the current coding block into a plurality of transform blocks (TB) and a plurality of prediction blocks (PB) includes: acquiring region partition information of the current coding block; and partitioning the current coding block into the plurality of TBs and PBs according to the region partition information of the current coding block.

In a possible implementation, acquiring region partition information of the current coding block includes: acquiring predefined region partition information of the current coding block; or, in a case that the method is performed by a decoding side, parsing a bit stream to acquire the region partition information of the current coding block.

In an eighteenth aspect, an embodiment of the present disclosure provides a picture coding method, which is performed by a coding side, and the method includes: if a prediction mode of a current coding block is an intra block copy prediction mode, partitioning the current coding block into a plurality of transform blocks (TB) and a plurality of prediction blocks (PB); starting from a second TB of the current coding block, allowing to refer reconstructed pixel values of a reconstructed TB on a left side of a current TB when performing motion compensation for PBs in each TB.

In a possible implementation, a coding manner of the coding side for a block vector (BV) or block vector difference (BVD) corresponding to the current coding block includes: for a horizontal motion search but not a vertical motion search, transmitting a horizontal BV or BVD, and not transmitting a vertical BV or BVD in a code stream.

In a possible implementation, a coding manner of the coding side for a block vector (BV) or block vector difference (BVD) corresponding to the current coding block includes fixed-length code.

In a possible implementation, a prediction block of the current coding block is obtained by: obtaining a matching block based on a block vector (BV) or block vector difference (BVD), processing the matching block to generate a final prediction block, where processing the matching block includes: performing prediction filtering and/or illumination compensation processing on the matching block.

In a nineteenth aspect, an embodiment of the present disclosure provides an electronic device, including a processor and a memory, the memory is configured to store computer instructions, and the processor is configured to call and run the computer instructions from the memory to realize the method described in any one of the seventeenth to eighteenth aspects and possible implementations thereof.

In a twentieth aspect, an embodiment of the present disclosure provides a computer-readable storage medium, in which a computer program or instruction is stored, and when the computer program or instruction is executed by a computing device or a storage system where the computing device is located, the method of any one of the seventeenth to eighteenth aspects and possible implementations thereof can be realized.

Embodiments of the present disclosure can be further combined to provide more implementations on the basis of the implementations provided by the above aspects.

DETAILED DESCRIPTION

Figure 1:
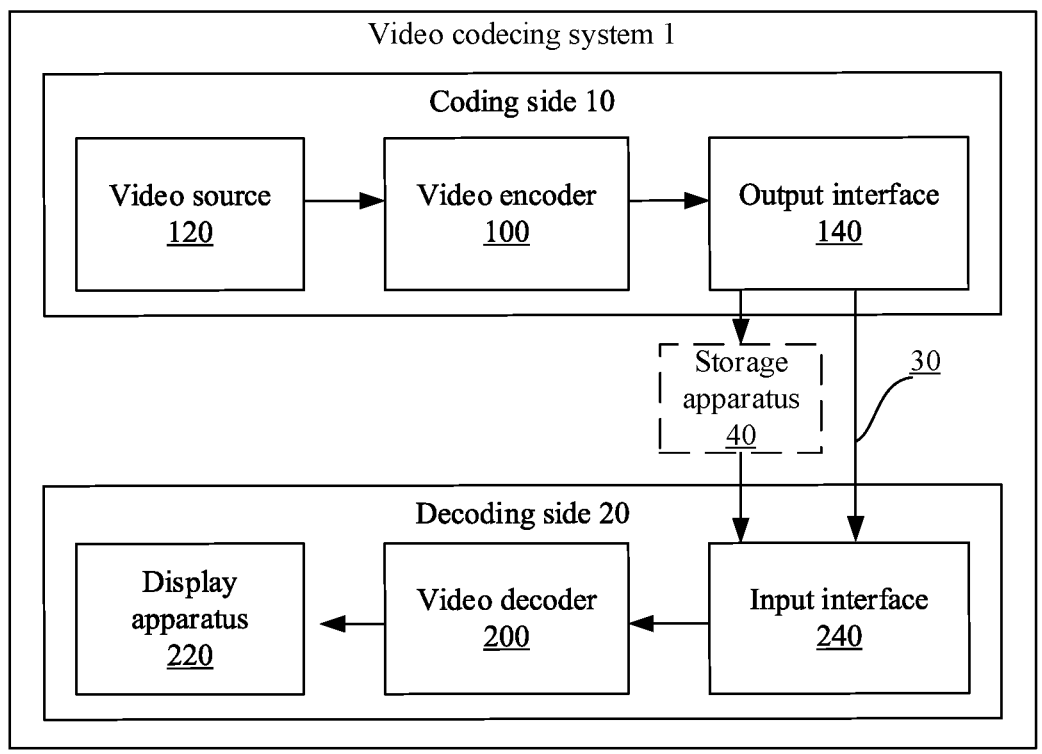
FIG. 1 is an exemplary block diagram of a video codecing system according to an embodiment of the present disclosure.

The term "and/or" in the present disclosure only describes the relationship of related objects, means that there can be three kinds of relationships, for example, A and/or B, which can mean that A exists alone, A and B exist together, and B exists alone.

The terms "first" and "second" in the description and claims of the embodiments of the present disclosure are used to distinguish different objects, not to describe a specific order of the objects. For example, a first preset value and a second preset value are used to distinguish different preset values, not to describe a specific order of preset values.

In embodiments of the present disclosure, the words "exemplary" or "for example" are used to indicate an example, illustration, or description. Any embodiment or design solution described as "exemplary" or "for example" in the embodiments of the present disclosure should not be construed as being preferred or advantageous over other embodiments or design solutions. Specifically, the use of words such as "exemplary" or "for example" aims to present relevant concepts in a concrete manner.

In the description of the embodiments of the present disclosure, unless otherwise indicated, "plurality" means two or more. For example, a plurality of processing units means two or more processing units, and a plurality of systems means two or more systems.

The picture decoding method, coding method provided by embodiments of the present disclosure can also be used for video decoding, video coding, it should be understood that the video includes a series of pictures (picture), and decoding and coding the video is essentially also decoding and coding all the pictures included in the video.

It can be understood that quantization involved in the picture coding process refers to mapping the continuous values (or a large number of discrete values) of a signal to a finite number of discrete values, and quantization can achieve a many to one mapping of signal values. In video coding, after a residual signal is transformed, transform coefficients tend to have a large dynamic range, so the quantization of the transform coefficients can effectively reduce a signal value space and obtain better compression effect. However, due to the many-to-one mapping mechanism, the quantization process inevitably introduces distortion, which is a root cause of distortion in video coding.

Dequantization is an inverse process of quantization, and dequantization refers to a mapping of quantized coefficients into a reconstructed signal in an input signal space, where the reconstructed signal is an approximation of an input signal.

Quantization includes scalar quantization (SQ) and vector quantization. The scalar quantization is a most basic quantization method, and an input of scalar quantization is one-dimensional scalar signal. A scalar quantization process includes: firstly, partitioning the input signal space into a series of disjoint intervals, and selecting a representative signal for each interval. Then, for each input signal, the input signal is scalar quantized into a representative signal of the interval where the input signal is located. An interval length is named as quantization step (denoted as Qstep), an interval index is level (Level), that is, a quantized value, and a parameter representing the quantization step is quantization parameter (QP).

The simplest scalar quantization method is uniform scalar quantization, which partitions the input signal space into equidistant intervals, and the representative signal of each interval is a midpoint of the interval.

The optimal scalar quantizer is Lloyd-Max quantizer. Lloyd-Max quantizer considers the distribution of input signals, and the interval partition is non-uniform. The representative signal of each interval is a probability centroid of the interval, and a boundary point of two neighbouring intervals is a midpoint of the representative signals of these two intervals.

The system architecture applied by the embodiment of the present disclosure will be described below. FIG. 1 is an exemplary block diagram of a video codecing system according to an embodiment of the present disclosure. As used herein, the term "video codec" generally refers to both a video encoder and a video decoder. In the present disclosure, the term "video codecing" or "codecing" may refer generally to video coding or video decoding. The video encoder 100 and the video decoder 200 in the video codecing system 1 are configured to predict motion information, such as a motion vector, of a currently codec picture block or its sub-blocks according to various method examples described in any of new inter prediction modes proposed in the present disclosure, such that a predicted motion vector is as close as possible to a motion vector obtained by using a motion estimation method, so that there is no need to transmit a motion vector difference value during coding, and the coding and decoding performance is further improved.

As shown in FIG. 1, the video codecing system 1 includes a coding side 10 and a decoding side 20. The coding side 10 generates coded video data. Thus, the coding side 10 may be referred to as a video coding apparatus. The decoding side 20 may decode the coded video data generated by the coding side 10. Thus, the decoding side 20 may be referred to as a video decoding apparatus. Various embodiments of the coding side 10, the decoding side 20, or both may include one or more processors and a memory coupled to the one or more processors. The memory may include, but is not limited to, RAM, ROM, EEPROM, flash memory or any other medium that can be configured to store desired program code in the form of instructions or data structures accessible by a computer, as described herein.

The coding side 10 and decoding side 20 can be various apparatuses, including desktop computers, mobile computing apparatuses, notebook (e.g., laptop) computers, tablet computers, set-top boxes, telephone handsets such as so-called "smart" phones, televisions, cameras, display apparatuses, digital media players, video game consoles, vehicle-mounted computers or the like.

The decoding side 20 may receive coded video data from the coding side 10 via a link 30. The link 30 may include one or more media or apparatuses capable of moving the coded video data from the coding side 10 to the decoding side 20. In an example, the link 30 may include one or more communication media that enable the coding side 10 to directly transmit the coded video data to the decoding side 20 in real time. In this example, the coding side 10 may modulate the coded video data according to a communication standard, such as a wireless communication protocol, and may transmit the modulated video data to the decoding side 20. The one or more communication media may include wireless and/or wired communication media, such as radio frequency (RF) spectrum or one or more physical transmission lines. The one or more communication media may form part of a packet-based network, such as a local area network, a wide area network or a global network (e.g., the Internet). The one or more communication media may include routers, switches, base stations or other devices that facilitate communication from the coding side 10 to the decoding side 20.

In another example, the coded data may be output from an output interface 140 to a storage apparatus 40. Similarly, the coded data can be accessed from the storage apparatus 40 through an input interface 240. The storage apparatus 40 may be a distributed or locally accessed data storage medium, such as a hard disk drive, a Blu-ray disc, a digital video disc (DVD), a compact disc read-only memory (CD-ROM), a flash memory, a volatile or nonvolatile memory, or any other suitable digital storage medium for storing coded video data.

In another example, the storage apparatus 40 may correspond to a file server or another intermediate storage device that may hold a coded video generated by the coding side 10. The decoding side 20 may access the stored video data from the storage apparatus 40 via streaming or download. The file server may be any type of server capable of storing coded video data and transmitting the coded video data to the decoding side 20. An example file server includes a network server (for example, for websites), a file transfer protocol (FTP) server, a network attached storage (NAS) apparatus, or a local disk drive. The decoding side 20 can store the coded video data through any standard data connection (including internet connection). This may include a wireless channel (e.g., a wireless-fidelity (Wi-Fi) connection), a wired connection (e.g., a digital subscriber line (DSL), a cable modem, etc.), or a combination of both suitable for accessing coded video data stored on a file server. The transmission of coded video data from the storage apparatus 40 may be streaming transmission, download transmission or a combination of both.

The picture decoding method provided by the present disclosure can be applied to video coding and decoding to support various multimedia applications, such as over-the-air television broadcasting, cable television transmission, satellite television transmission, streaming video transmission (for example, via the Internet), coding of video data stored on data storage media, decoding of video data stored on data storage media, or other applications. In some examples, the video codecing system 1 can be configured to support unidirectional or bidirectional video transmission to support applications such as video streaming, video playback, video broadcasting and/or video telephony.

The video codecing system 1 illustrated in FIG. 1 is only an example, and the technology of the present disclosure may be applicable to video decoding settings that do not necessarily include any data communication between a coding apparatus and a decoding apparatus (such as video coding or video decoding). In other examples, data is retrieved from local storage, streamed over a network, and so on. A video coding apparatus may code data and store the data in a memory, and/or a video decoding apparatus may retrieve data from the memory and decode the data. In many examples, coding and decoding are performed by apparatuses that do not communicate with each other but only code data to and/or retrieve data from the memory and decode the data.

In the example of FIG. 1, the coding side 10 includes a video source 120, a video encoder 100, and an output interface 140. In some examples, the output interface 140 may include a modulator/demodulator (modem) and/or a transmitter. The video source 120 may include a video capture apparatus (e.g., a video camera), a video archive containing previously captured video data, a video feed interface to receive video data from a video content provider, and/or a computer graphics system for generating video data, or a combination of such sources of video data.

The video encoder 100 may code video data from a video source 120. In some examples, the coding side 10 directly transmits the coded video data to the decoding side 20 through the output interface 140. In other examples, the coded video data can further be stored on the storage apparatus 40 for later access by the decoding side 20 for decoding and/or playback.

In the example of FIG. 1, the decoding side 20 includes an input interface 240, a video decoder 200, and a display apparatus 220. In some examples, the input interface 240 includes a receiver and/or a modem. The input interface 240 may receive coded video data via the link 30 and/or from the storage apparatus 40. The display apparatus 220 may be integrated with the decoding side 20 or may be external to the decoding side 20. Generally, the display apparatus 220 displays the decoded video data. The display apparatus 220 may include various display apparatuses, for example, a liquid crystal display (LCD), a plasma display, an organic light-emitting diode (OLED) display or other types of display apparatuses.

Although not illustrated in FIG. 1, in some aspects, the video encoder 100 and the video decoder 200 may each be integrated with an audio coder and decoder, and may include appropriate multiplexer-demultiplexer units or other hardware and software to dispose of the coding of both the audio and the video in a common data stream or in separate data streams. In some examples, if applicable, a demultiplexer (MUX-DEMUX) unit may conform to the ITU H.223 multiplexer protocol, or other protocols such as the user datagram protocol (UDP).

The video encoder 100 and the video decoder 200 can each be implemented as, for example, any of the following circuits: one or more microprocessors, digital signal processor (DSP), application-specific integrated circuits (ASIC), field programmable gate array (FPGA), discrete logic, hardware or any combination thereof. If the present disclosure is partially implemented in software, an apparatus may store instructions for the software in a suitable nonvolatile computer-readable storage medium, and may execute the instructions in hardware using one or more processors to implement the technology of the present disclosure. Any of the foregoing (including hardware, software, a combination of hardware and software, etc.) can be regarded as one or more processors. Both the video encoder 100 and the video decoder 200 may be included in one or more coders or decoders, and any one of the coders or decoders may be integrated as a part of a combined coder/decoder (codec) in a corresponding apparatus.

The present disclosure can generally refer to the video encoder 100 as "signaling" or "transmitting" some information to another apparatus, such as the video decoder 200. The terms "signaling" or "transmitting" may generally refer to the transmission of syntax elements and/or other data used to decode compressed video data. This transmission may occur in real time or near real time. Alternatively, this communication may occur after a period of time, for example, when a syntax element is stored in a computer-readable storage medium in a coded bit stream at the time of coding, and the decoding apparatus may then retrieve the syntax element at any time after the syntax element is stored in this medium.

JCT-VC developed the H.265 (HEVC) standard. HEVC standardization is based on an evolutionary model of video decoding apparatuses named as an HEVC test model (or referred to HEVC model, HM). The latest standard document of H.265 can be obtained from http://www.itu.int/rec/T-REC-H.265. The latest version of the standard document is H.265(12/16), which is incorporated by reference in its entirety. HM assumes that the video decoding apparatus has several additional capabilities compared with the existing algorithms of ITU-T.264/AVC. For example, H.264 provides 9 intra prediction coding modes, while HM can provide up to 35 intra prediction coding modes.

JVET is committed to developing the H.266 standard. A process of H.266 standardization is based on an evolution model of video decoding apparatus named as H.266 test model. An algorithm description for H.266 can be obtained from http://phenix.int-evry.fr/jvet, and the latest algorithm description is contained in JVET-F1001-v2, which is incorporated by reference in its entirety. At the same time, a reference software of JEM test model can be obtained from https://jvet.hhi.fraunhofer.de/svn/svn_HMJEMSoftware/, which is also incorporated by reference in its entirety.

Generally speaking, a working model of HM describes that a video frame or picture can be partitioned into a sequence of tree blocks or largest coding units (LCU) containing both luma and chroma samples, and LCU is also named as coding tree unit (CTU). The tree block has a similar purpose to a macro block of the H.264 standard. A slice contains several consecutive tree blocks in decoding order. A video frame or picture can be partitioned into one or more slices. Each tree block can be split into coding units (CUs) according to quadtree. For example, a tree block that is a root node of a quadtree can be split into four child nodes, and each child node can be a parent node and split into four other child nodes. A final non-splittable child node that is a leaf node of the quadtree includes a decoding node, e.g., a decoded video block. The syntax data associated with the decoded bit stream can define a maximum number of times a tree block can be split, and can also define a minimum size of a decoding node.

A size of CU corresponds to a size of the decoding node and must be square in shape. The size of the CU can range from 8×8 pixels up to a maximum size of 64×64 pixels or larger tree blocks.

A video sequence usually contains a series of video frames or pictures. A group of picture (GOP) illustratively includes a series, one or more video pictures. Grammar data may be included in header information of a GOP, in header information of one or more pictures, or elsewhere, which describes the number of pictures included in the GOP. Each slice of a picture may contain slice syntax data describing a coding mode of the corresponding picture. The video encoder 100 generally operates on video blocks within individual video slices in order to code video data. A video block may correspond to a decoding node within a CU. The video block may have a fixed or variable size and may vary in size depending on a specified decoding standard.

In the present disclosure, "N×N" and "N by N" can be used interchangeably to refer to a pixel size of a video block according to a vertical dimension and a horizontal dimension, such as 16×16 pixels or 16 by 16 pixels. Generally speaking, a 16×16 block will have 16 pixel points in a vertical direction (y=16) and 16 pixel points in a horizontal direction (x=16). Similarly, an N×N block generally has N pixel points in the vertical direction and N pixel points in the horizontal direction, where N represents a non-negative integer value. Pixels in a block can be arranged in rows and columns. Furthermore, a block does not necessarily need to have the same number of pixel points in the horizontal direction as in the vertical direction. For example, a block may include N×M pixel points, where M is not necessarily equal to N.

After intra/inter predictive decoding using CU, the video encoder 100 may calculate residual data of CU. CU may include pixel data in spatial domain (also named as pixel domain), and may further include coefficients in transform domain after applying a transform (for example, discrete cosine transform (DCT), integer transform, discrete wavelet transform or conceptually similar transform) to residual video data. The residual data may correspond to a pixel difference between a pixel of an uncoded picture and a prediction value corresponding to CU. The video encoder 100 may form a CU containing residual data and generate transform coefficients of the CU.

After any transform to generate transform coefficients, the video encoder 100 may perform quantization of the transform coefficients to minimize the amount of data used to represent the coefficients to provide further compression. Quantization may reduce a bit depth associated with some or all of the coefficients. For example, n-bit values can be truncated to m-bit values during quantization, where n is greater than m.

In some feasible implementations, the video encoder 100 may scan quantized transform coefficients with a predefined scanning order to generate a serialization vector that can be entropy coded. In other feasible implementations, the video encoder 100 may perform adaptive scanning. After scanning the quantized transform coefficients to form a one-dimensional vector, the video encoder 100 may perform context-based adaptive variable-length coding (CAVLC), context-based adaptive binary arithmetic coding (CABAC), syntax-based adaptive binary arithmetic coding (SBAC), probability interval partitioning entropy (PIPE) coding or other entropy coding methods to entropy code the one-dimensional vector. The video encoder 100 may also entropy code syntax elements associated with coded video data for use by the video decoder 200 in decoding the video data.

To perform CABAC, the video encoder 100 may assign a context within a context model to a to-be-transmitted symbol. The context can be related to whether or not neighbouring values of a symbol are non-zero. In order to perform CAVLC, the video encoder 100 may select a variable-length code of the to-be-transmitted symbol. Codewords in the variable-length code (VLC) can be constructed such that relatively short codes correspond to symbols with high probability, while longer codes correspond to symbols with low probability. Compared with using equal length codewords for each to-be-transmitted symbol, the use of VLC can achieve the purpose of saving bit rate. A probability in CABAC can be determined based on the context assigned to the symbol.

In an embodiment of the present disclosure, a video encoder may perform inter prediction to reduce temporal redundancy between pictures. The present disclosure may refer to a CU that the video decoder is currently decoding as a current CU. The present disclosure may refer to a picture that the video decoder is currently decoding as a current picture.

Figure 2:
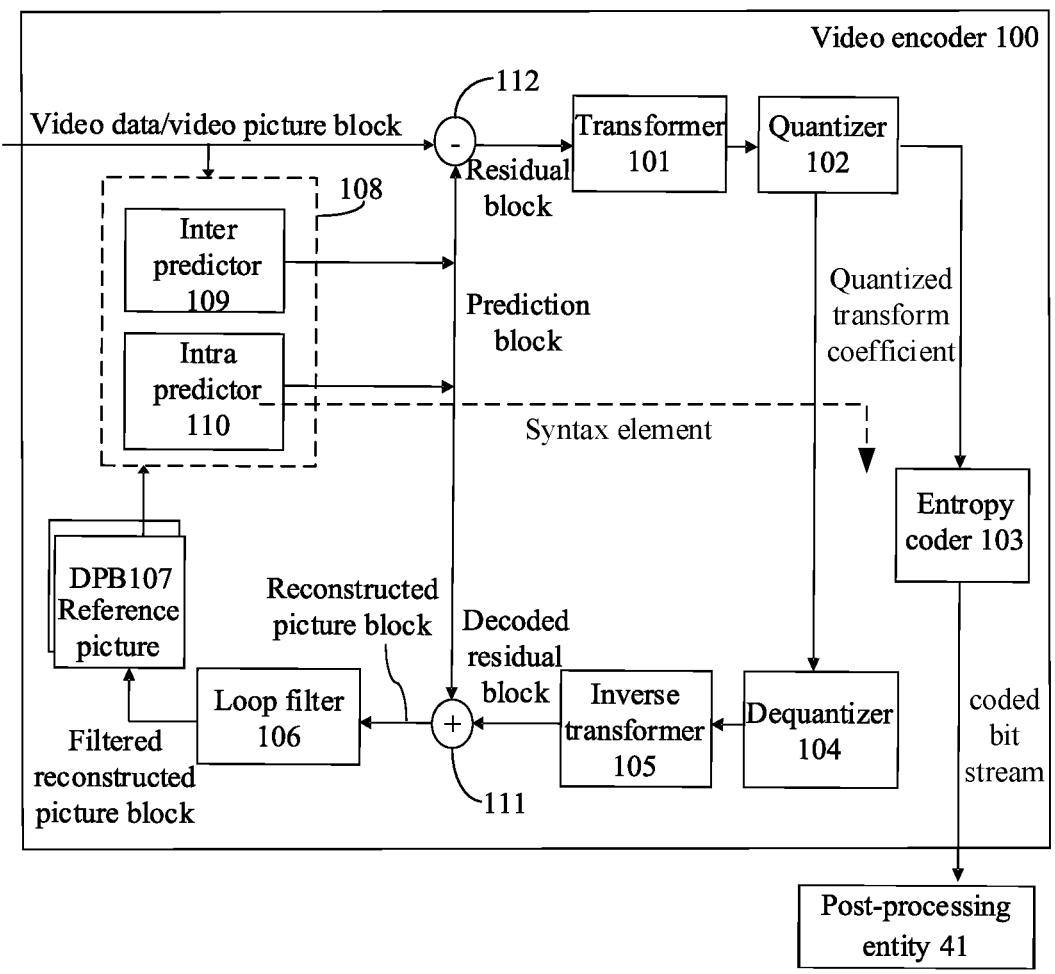
FIG. 2 is an exemplary block diagram of a video encoder according to an embodiment of the present disclosure.

FIG. 2 is an exemplary block diagram of a video encoder according to the present disclosure. The video encoder 100 is configured to output video to a post-processing entity 41. The post-processing entity 41 represents an example of a video entity that can process the coded video data from the video encoder 100, such as a media aware network element (MANE) or a splicing/editing apparatus. In some cases, the post-processing entity 41 may be an example of a network entity. In some video coding systems, the post-processing entity 41 and the video encoder 100 may be parts of a single apparatus, while in other cases, the functionality described with respect to the post-processing entity 41 may be performed by the same apparatus including the video encoder 100. In an example, the post-processing entity 41 is an example of the storage apparatus 40 of FIG. 1.

In the example of FIG. 2, the video encoder 100 includes a prediction processing unit 108, a filter unit 106, a decoded picture buffer (DPB) 107, a summer 112, a transformer 101, a quantizer 102 and an entropy coder 103. The prediction processing unit 108 includes an inter predictor 110 and an intra predictor 109. For picture block reconstruction, the video encoder 100 further includes a dequantizer 104, an inverse transformer 105 and a summer 111. The filter unit 106 is intended to represent one or more loop filters, such as a deblocking filter, an adaptive loop filter (ALF) and a sample adaptive offset (SAO) filter. Although the filter unit 106 is shown as an in-loop filter in FIG. 2, in other implementations, the filter unit 106 may be implemented as a post-loop filter. In an example, the video encoder 100 may further include a video data memory and a segmentation unit (not shown).

The video data memory may store video data to be coded by components of the video encoder 100. Video data can be obtained from a video source 120 and stored in the video data memory. A DPB 107 may be a reference picture memory, which stores reference video data for coding video data by the video encoder 100 in intra and inter coding modes. The video data memory and DPB 107 may be formed from any of a variety of memory apparatuses, such as a dynamic random access memory (DRAM) including synchronous dynamic random access memory (SDRAM), a magnetic random access memory (MRAM), a resistive random access memory (RRAM), or other types of memory apparatuses. The video data memory and the DPB 107 may be provided by the same memory apparatus or separate memory apparatuses. In various examples, the video data storage may be on-chip with other components of the video encoder 100, or off-chip with respect to those components.

As shown in FIG. 2, the video encoder 100 receives video data and stores the video data in a video data memory. The segmentation unit segments the video data into a number of picture blocks, and these picture blocks may be further segmented into smaller blocks, e.g. picture block segmentation based on a quadtree structure or a binary tree structure. This segmentation may further include segmentation into slice, tile, or other larger units. The video encoder 100 generally represents a component for coding blocks of pictures within a to-be-coded video slice. The slice can be partitioned into a plurality of picture blocks (and possibly into a set of picture blocks named as slices). The prediction processing unit 108 may select one of a plurality of possible codecing modes for the current picture block, such as one of a plurality of intra codecing modes or one of a plurality of inter codecing modes. The prediction processing unit 108 may provide a block obtained by intra codecing and inter codecing to the summer 112 to generate a residual block, and to the summer 111 for reconstructing the coded block for used as a reference picture.

The intra predictor 109 in the prediction processing unit 108 may perform intra predictive coding of the current picture block with respect to one or more neighbouring blocks in the same frame or slice as the to-be-coded current block to remove spatial redundancy. The inter predictor 110 within the prediction processing unit 108 may perform inter predictive coding of the current picture block with respect to one or more prediction blocks in one or more reference pictures to remove temporal redundancy.

Specifically, the inter predictor 110 may be configured to determine an inter prediction mode for coding the current picture block. For example, the inter predictor 110 may use bit rate-distortion analysis to calculate rate-distortion values of various inter prediction modes in a set of candidate inter prediction modes, and select an inter prediction mode with best bit rate-distortion characteristics. Bit rate distortion analysis generally determines the amount of distortion (or error) between a coded block and an original uncoded block that was coded to generate the coded block, and a bit rate (that is, the number of bits) used to generate the coded block. For example, the inter predictor 110 may determine that an inter prediction mode with a lowest cost of coding the current picture block in the set of candidate inter prediction modes is an inter prediction mode used for inter prediction of the current picture block.

The inter predictor 110 is configured to predict motion information (e.g., motion vectors) of one or more sub-blocks in the current picture block based on the determined inter prediction mode, and acquire or generate a prediction block of the current picture block by using the motion information (e.g., motion vectors) of one or more sub-blocks in the current picture block. The inter predictor 110 may locate a prediction block pointed by the motion vector in a reference picture list. The inter predictor 110 may further generate syntax elements associated with picture blocks and video slices for use by the video decoder 200 when decoding picture blocks of video slices. Or, in an example, for each of the one or more sub-blocks, the inter predictor 110 performs a motion compensation process using the motion information of the sub-block to generate a prediction block of the sub-block, thereby obtaining a prediction block of the current picture block. It should be understood that the inter predictor 110 here performs motion estimation and motion compensation processes.

Specifically, after selecting an inter prediction mode for the current picture block, the inter predictor 110 may provide information indicating the selected inter prediction mode of the current picture block to the entropy coder 103, so that the entropy coder 103 can code information indicating the selected inter prediction mode.

The intra predictor 109 may perform intra prediction on the current picture block. Specifically, the intra predictor 109 may determine an intra prediction mode for coding the current block. For example, the intra predictor 109 may use bit rate-distortion analysis to calculate rate-distortion values of various to-be-tested intra prediction modes, and select an intra prediction mode with best bit rate-distortion characteristics from the to-be-tested modes. In any case, after selecting an intra prediction mode for a picture block, the intra predictor 109 may provide information indicating the selected intra prediction mode of the current picture block to the entropy coder 103, so that the entropy coder 103 codes information indicating the selected intra prediction mode.

After the prediction processing unit 108 generates a prediction block of the current picture block through inter prediction and intra prediction, the video encoder 100 forms a residual picture block by subtracting the prediction block from a to-be-coded current picture block. The summer 112 represents one or more components that perform this subtraction operation. Residual video data in the residual block may be included in one or more transform units (TUs) and applied to the transformer 101. The transformer 101 transforms the residual video data into residual transform coefficients using, for example, discrete cosine transform (DCT) or a conceptually similar transform. The transformer 101 can transform the residual video data from a pixel value domain to a transform domain, such as a frequency domain.

The transformer 101 may send the obtained transform coefficients to the quantizer 102. The quantizer 102 quantizes the transform coefficients to further reduce the bit rate. In some examples, the quantizer 102 may then perform a scan of a matrix containing quantized transform coefficients. Or, the entropy coder 103 may perform scanning.

After quantization, the entropy coder 103 entropy codes the quantized transform coefficients. For example, the entropy coder 103 may perform context-based adaptive variable-length coding (CAVLC), context-based adaptive binary arithmetic coding (CABAC), syntax-based adaptive binary arithmetic coding (SBAC), probability interval partitioning entropy (PIPE) coding, or another entropy coding method or technique. After entropy coding by the entropy coder 103, the coded bit stream may be transmitted to the video decoder 200 or archived for later transmission or retrieval by the video decoder 200. The entropy coder 103 may further perform entropy code on syntax elements of the to-be-coded current picture block.

The dequantizer 104 and inverse transformer 105 respectively apply dequantization and inverse transform to reconstruct the residual block in the pixel domain, for example, for later use as a reference block of a reference picture. The summer 111 adds the reconstructed residual block to a prediction block generated by the inter predictor 110 or the intra predictor 109 to generate a reconstructed picture block. The filter unit 106 may be applied to the reconstructed picture block to reduce distortion, such as block artifacts. Then, the reconstructed picture block is stored as a reference block in the decoded picture buffer 107, which can be used as a reference block by the inter predictor 110 for inter prediction of blocks in subsequent video frames or pictures.

It should be understood that other structural variations of the video encoder 100 can also be configured to code video streams. For example, for some picture blocks or picture frames, the video encoder 100 can directly quantize a residual signal without being processed by the transformer 101 and correspondingly without being processed by the inverse transformer 105. Or, for some picture blocks or picture frames, the video encoder 100 does not generate residual data, and accordingly does not need to be processed by the transformer 101, the quantizer 102, the dequantizer 104 and the inverse transformer 105. Or, the video encoder 100 can directly store the reconstructed picture block as a reference block without being processed by the filter unit 106. Or, the quantizer 102 and the dequantizer 104 in the video encoder 100 can be combined together.

Figure 3:
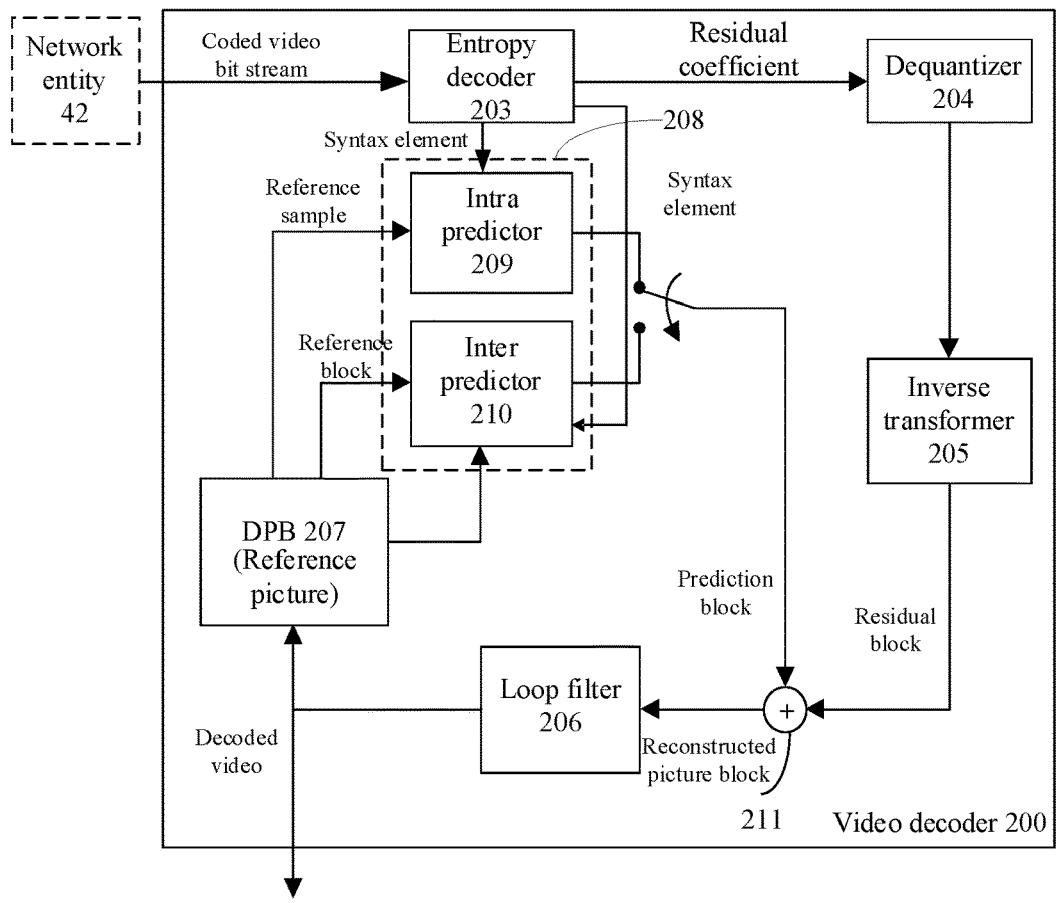
FIG. 3 is an exemplary block diagram of a video decoder according to an embodiment of the present disclosure.

FIG. 3 is an exemplary block diagram of a video decoder 200 according to the present disclosure. In the example of FIG. 3, the video decoder 200 includes an entropy decoder 203, a prediction processing unit 208, a dequantizer 204, an inverse transformer 205, a summer 211, a filter unit 206 and a DPB 207. The prediction processing unit 208 may include an inter predictor 210 and an intra predictor 209. In some examples, the video decoder 200 may perform a decoding process that is substantially inverse to the coding process described with respect to the video encoder 100 from FIG. 2.

During decoding, the video decoder 200 receives a coded video bit stream representing a picture block of a coded video slice and associated syntax elements from the video encoder 100. The video decoder 200 can receive video data from a network entity 42, and optionally, it can further store the video data in a video data memory (not shown). The video data memory may store video data to be decoded by components of the video decoder 200, such as a coded video bit stream. The video data stored in the video data memory can be obtained, for example, from the storage apparatus 40, from a local video source such as a camera, through wired or wireless network communication of video data, or by accessing a physical data storage medium. The video data memory can be used as a decoded picture buffer (DPB) for storing coded video data from a coded video bit stream. Therefore, although the video data memory is not shown in FIG. 3, the video data memory and the DPB 207 may be the same memory or separately set memories. The video data memory and the DPB 207 may be formed by any of a variety of memory apparatuses, such as dynamic random access memory (DRAM) including synchronous DRAM (SDRAM), magnetic RAM (MRAM), resistive RAM (RRAM), or other types of memory apparatuses. In various examples, the video data memory may be integrated on a chip together with other components of the video decoder 200, or disposed off-chip with respect to those components.

The network entity 42 may be a server, MANE, video editor/splicer, or other apparatuses for implementing one or more of the techniques described above. The network entity 42 may or may not include a video encoder, such as video encoder 100. Before the network entity 42 sends the coded video bit stream to the video decoder 200, the network entity 42 may implement some of the techniques described in the present disclosure. In some video codecing systems, the network entity 42 and the video decoder 200 may be part of a single apparatus, while in other cases, the functionality described with respect to the network entity 42 may be performed by the same apparatus including the video decoder 200. In some cases, the network entity 42 may be an example of the storage apparatus 40 of FIG. 1.

The entropy decoder 203 of the video decoder 200 entropy decodes the bit stream to generate quantized coefficients and some syntax elements. The entropy decoder 203 forwards the syntax elements to the prediction processing unit 208. The video decoder 200 may receive syntax elements at a video slice level and/or a picture block level.

When a video slice is decoded as an intra-decoded (I) slice, the intra predictor 209 of the prediction processing unit 208 may generate a prediction block of a picture block of the current video slice based on a signaled intra-prediction mode and data from a previously decoding block of the current frame or picture. When a video slice is decoded as an inter-decoded (i.e., B or P) slice, the inter predictor 210 of the prediction processing unit 208 may determine an inter prediction mode for decoding the current picture block of the current video slice based on a syntax element received from the entropy decoder 203, and decode (e.g., perform inter prediction) the current picture block based on the determined inter prediction mode. Specifically, the inter predictor 210 can determine whether to use a new inter prediction mode to predict the current picture block of the current video slice, and if the syntax element indicates that a new inter-frame prediction mode is to be used to predict the current picture block, the inter predictor predict motion information of a current picture block or a sub-block of the current picture block of the current video slice based on the new inter prediction mode (such as a new inter prediction mode specified by the syntax element or a new inter prediction mode by default), thereby using the predicted motion information of the current picture block or the sub-block of the current picture block to acquire or generate a prediction block of the current picture block or the sub-block of the current picture block through a motion compensation process. The motion information here may include reference picture information and motion vectors, where the reference picture information may include but not limited to unidirectional/bidirectional prediction information, reference picture list number and reference picture index corresponding to the reference picture list. For inter prediction, a prediction block may be generated from one of the reference pictures in the reference picture list. The video decoder 200 may construct reference picture lists, namely List 0 and List 1, based on the reference pictures stored in the DPB 207. The reference frame index of the current picture may be included in the reference frame list 0 and/or list 1. In some examples, the video encoder 100 may signal a specific syntax element indicating whether a new inter prediction mode is adopted to decode a specific block, or it may signal a specific syntax element indicating whether a new inter prediction mode is adopted and which new inter prediction mode is specifically adopted to decode a specific block. It should be understood that the inter predictor 210 here performs a motion compensation process.

The dequantizer 204 will perform dequantization, i.e. dequantization, on the quantized transform coefficients provided in the bit stream and decoded by the entropy decoder 203. Dequantization may include using quantization parameters calculated by the video encoder 100 for each picture block in a video slice to determine a degree of quantization to be applied and likewise determine a degree of dequantization to be applied. The inverse transformer 205 applies inverse transform to transform coefficients, such as inverse DCT, inverse integer transform or conceptually similar inverse transform process, so as to generate a residual block in the pixel domain.

After the inter predictor 210 generates a prediction block for the current picture block or a sub-block of the current picture block, the video decoder 200 obtains a reconstructed block, i.e., a decoded picture block, by summing a residual block from the inverse transformer 205 with a corresponding prediction block generated by the inter predictor 210. The summer 211 represent components that perform this summing operation. When needed, a loop filter (in or after a decoding loop) can further be configured to smooth pixel transitions or improve video quality in other ways. The filter unit 206 may represent one or more loop filters, such as a deblocking filter, an adaptive loop filter (ALF) and a sample adaptive offset (SAO) filter. Although the filter unit 206 is shown as an in-loop filter in FIG. 3, in other implementations, the filter unit 206 may be implemented as a post-loop filter. In an example, the filter unit 206 is adapted to reconstruct a block to reduce block distortion, and the result is output as a decoded video stream. Moreover, a decoded picture block in a given frame or picture can be stored in the DPB 207, and the DPB 207 stores a reference picture for subsequent motion compensation. The DPB 207 may be part of a memory that may further store decoded video for later presentation on a display apparatus (e.g., the display apparatus 220 of FIG. 1), or may be separate from such memory.

It should be understood that other structural variations of the video decoder 200 can be configured to decode the coded video bit stream. For example, the video decoder 200 may generate an output video stream without being processed by the filter unit 206. Or, for some picture blocks or picture frames, the entropy decoder 203 of the video decoder 200 does not decode the quantized coefficients, and accordingly it does not need to be processed by the dequantizer 204 and the inverse transformer 205.

The technology of the present disclosure can be performed by any of the video encoders or video decoders described in the present disclosure, such as the video encoder 100 and the video decoder 200 shown and described with respect to FIGS. 1 to 3. That is, in a feasible implementation, the video encoder 100 described in FIG. 2 may perform certain techniques described below when performing inter prediction during coding of blocks of video data. In another feasible implementation, the video decoder 200 described with respect to FIG. 3 may perform certain techniques described below when performing inter prediction during decoding of blocks of video data. Therefore, a reference to a generic "video encoder" or "video decoder" may include the video encoder 100, the video decoder 200, or another video coding or decoding unit.

FIGS. 1 to 3 are only examples provided by embodiments of the present disclosure, and in some examples, the video encoder 100, the video decoder 200, and the video codecing system may include more or fewer components or units, which are not limited by the present disclosure.

Figure 4:
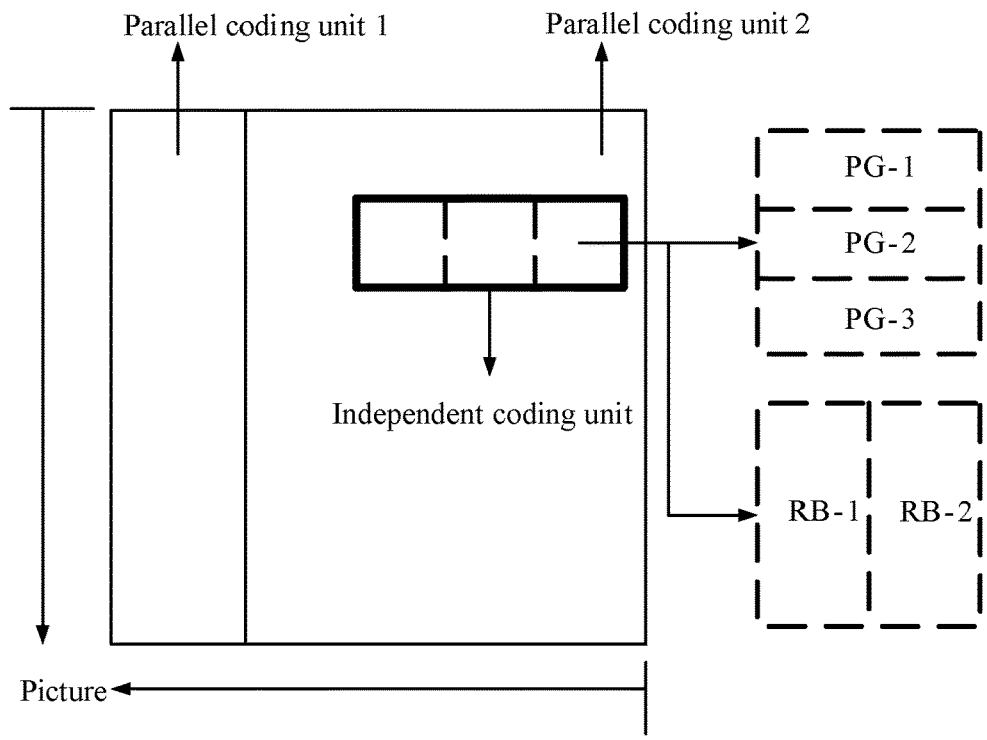
FIG. 4 is a flowchart of a video coding/decoding according to an embodiment of the present disclosure.

On the basis of the video codecing system shown in FIGS. 1 to 3, an embodiment of the present disclosure provides a possible video coding/decoding implementation. As shown in FIG. 4, FIG. 4 is a flow diagram of a video coding/decoding process provided by the present disclosure, the video coding/decoding implementation includes processes ① to process ⑤, and processes ① to process ⑤ may be performed by any one or more of the above-described coding side 10, video encoder 100, decoding side 20, or video decoder 200.

Process ①: a frame of picture is partitioned into one or more non-overlapping parallel coding units. There is no dependency between the one or more parallel coding units, which can be completely parallel/independent coding and decoding, such as parallel coding unit 1 and parallel coding unit 2 shown in FIG. 4.

Process ②: for each parallel coding unit, it can be partitioned into one or more independent coding units that are not overlapped with each other, and the independent coding units can be independent of each other, but they can share some parallel coding unit header information.

For example, a width of an independent coding unit is w_lcu and a height is h_lcu. If the parallel coding unit is partitioned into an independent coding unit, the dimension of the independent coding unit is exactly the same as that of the parallel coding unit. Otherwise, the width of the independent coding unit should be greater than the height (unless it is an edge region).

Generally, the independent coding unit can be a fixed w_lcu×h_lcu, and both w_lcu and h_lcu are Nth power of 2 (N≥0). For example, the size of independent coding unit can be: 128×4, 64×4, 32×4, 16×4, 8×4, 32×2, 16×2 or 8×2, etc.

As a possible example, the independent coding unit may be a fixed 128×4. If the size of the parallel coding unit is 256×8, the parallel coding unit can be equally partitioned into four independent coding units. If the size of the parallel coding unit is 288×10, the parallel coding unit can be partitioned into: the first/second row consists of two independent coding units of 128×4+one independent coding unit of 32×4, and the third row consists of two independent coding units of 128×2+one independent coding unit of 32×2.

It is worth noting that the independent coding unit can either include three components of luma Y, chroma Cb, and chroma Cr, or the three components of red (R), green (G), and blue (B), or it can include only one of these components. If the independent coding unit contains three components, the sizes of these three components can be exactly the same or different, which is related to an input format of the picture.

Process ③: for each independent coding unit, it can be further partitioned into one or more non-overlapping coding units, and each coding unit in the independent coding unit can depend on each other, e.g., multiple coding units can be cross-referenced to pre-coding and pre-decoding.

If the coding unit has the same size as the independent coding unit (i.e., the independent coding unit is only partitioned into one coding unit), its size can be all the sizes described in process ②.

If an independent coding unit is partitioned into a plurality of coding units that do not overlap with each other, feasible partition examples are: horizontal equal partition (the height of the coding unit is the same as that of the independent coding unit, but the widths are different, and may be ½, ¼, ⅛, 1/16, etc.) and vertical equal partition (the width of the coding unit is the same as the independent coding unit, but the heights are different, which can be ½, ¼, ⅛, 1/16, etc.), horizontal and vertical equal partition (quadratic tree partition), etc., with horizontal equal partition being preferred.

If the width of the coding unit is w_cu and the height is h_cu, its width should be greater than its height (except in the edge region). Generally, the coding unit can be fixed w_cu×h_cu, and both w_cu and h_cu are Nth power of 2 (N is greater than or equal to 0), such as 16×4, 8×4, 16×2, 8×2, 8×1, 4×1, etc.

As a possible example, the coding unit may be a fixed 16×4. If the size of the independent coding unit is 64×4, the independent coding unit can be equally partitioned into four coding units. If the size of the independent coding unit is 72×4, the coding unit is partitioned into four 16×4+one 8×4.

It is worth noting that the coding unit can either contain three components of luma Y, chroma Cb, and chroma Cr (or three components of red R, green G, and blue B), or only one of these components. If there are three components, the dimensions of several components can be exactly the same or different, which related to a picture input format.

It is worth noting that process ③ is an optional step in the video coding and decoding method, and the video encoder/decoder can code/decode a residual coefficient (or residual value) of the independent coding unit obtained in process ②.

Process ④: for the coding unit, it can be further partitioned into one or more non-overlapping prediction groups (PG). PG can also be referred to as Group. Each PG is coded and decoded according to a selected prediction mode to obtain a prediction value of each PG. The prediction value of each PG constitutes a prediction value of the whole coding unit. Based on the prediction value of the coding unit and an original value of the coding unit, a residual value of the coding unit can be obtained.

Process ⑤: based on the residual value of the coding unit, the coding unit is grouped to obtain one or more non-overlapping residual sub-blocks (or residual block, RB), and residual coefficients of each RB are coded and decoded according to the selected mode to form a residual coefficient stream. Specifically, it can be divided into two categories: transforming the residual coefficients and not transforming them.

The selected mode of residual coefficient coding and decoding method in process ⑤ may include but not limited to any of the following: semi-fixed length coding method, exponential Golomb coding method, Golomb-Rice coding method, truncated unary code coding method, run-length coding method, direct coding of original residual value, etc.

For example, the video encoder can directly code coefficients within an RB.

For another example, the video encoder can also transform the residual block, such as DCT, DST and Hadamard transform, and then code the transformed coefficients.

As a possible example, when the RB is small, the video encoder can directly perform uniform quantization on each coefficient in the RB, and then perform binary coding. If the RB is large, it can be further partitioned into multiple coefficient groups (CG), and each CG can be uniformly quantified and then binarized for coding. In some embodiments of the present disclosure, CG and quantization group may be the same.

The following is an example explanation of the residual coefficient coding using a semi-fixed length coding method. Firstly, a maximum absolute value of residual in an RB block is defined as modified maximum. Secondly, the number of coded bits of a residual coefficient in the RB block is determined, and the number of coded bits of the residual coefficient in the same RB block is the same. For example, if a critical limit (CL) of the current RB block is 2 and a current residual coefficient is 1, the coding residual coefficient 1 needs 2 bits, which is expressed as 01. If the CL of the current RB block is 7, it indicates coding 8-bit residual coefficient and 1-bit sign bit. The determination of CL is to find a minimum M value that satisfies that all residuals of a current sub-block are within the range of $[-2^{(M-1)}, 2^{(M-1)}]$. If both $-2^{(M-1)}$ and $2^{(M-1)}$ boundary values are present, M shall be increased by one, i.e., M+1 bits are required to code all the residuals of the current RB block, if only one of $-2^{(M-1)}$ and $2^{(M-1)}$ boundary values is present, a Trailing bit is required to be coded to determine whether the boundary value is $-2^{(M-1)}$ or $2^{(M-1)}$. If neither $-2^{(M-1)}$ nor $2^{(M-1)}$ exists, there is no need to code the Trailing bit.

For some special cases, the video encoder can also directly code the original value of the picture instead of the residual value.

A coding block in the embodiment of the present disclosure corresponds to a picture block in a picture, and the coding block may be a coding unit obtained by the above process ③ of partition, or a prediction group of the coding unit after further partition.

With reference to the above-mentioned schematic block diagrams of the video codecing system shown in FIG. 1, the video encoder shown in FIG. 2, and the video decoder shown in FIG. 3, the picture decoding method and coding method involved in the embodiment of the present disclosure will be described in detail below.

Figure 5:
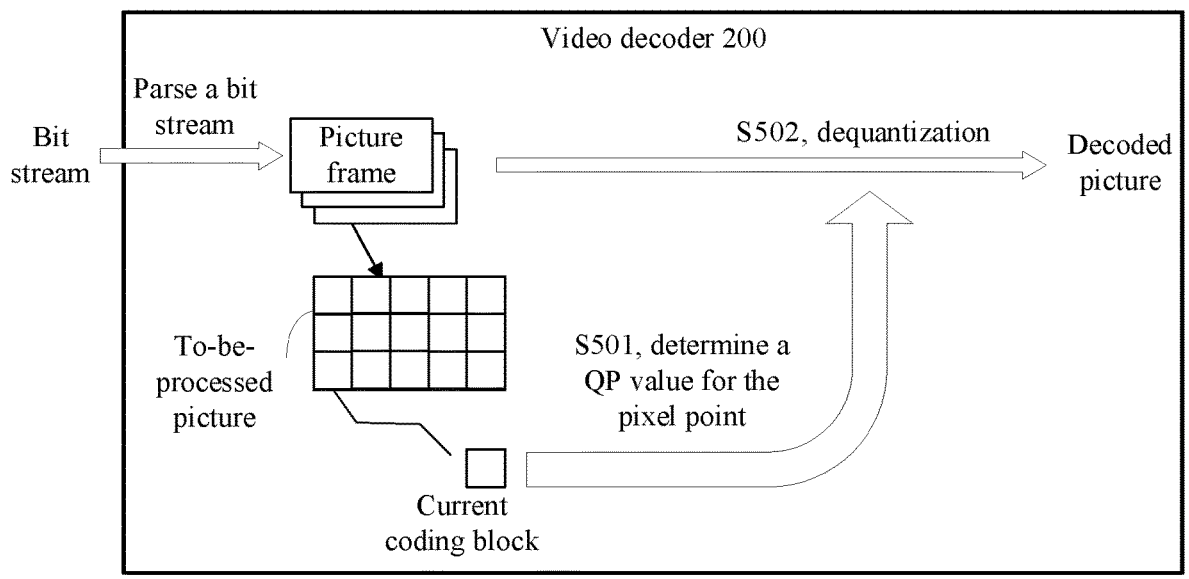
FIG. 5 is a flowchart of a picture decoding method according to an embodiment of the present disclosure.

FIG. 5 is a flowchart of a picture decoding method provided by the present disclosure, which can be applied to the video codecing system shown in FIG. 1 and can be executed by the decoding side 20. Specifically, the decoding method can be executed by the video decoder 200 included in the decoding side 20. As shown in FIG. 5, the picture decoding method provided by embodiments of the present disclosure includes the following steps.

At S501, for any one pixel point or any plurality of parallel dequantized pixel points in a current coding block, a QP value for the pixel point(s) is determined.

At least two pixel points in the current coding block are of different QP values. Parallel dequantization of pixel points means that for some pixel points, these pixel points can be dequantized in parallel.

Any pixel point or any plurality of parallel dequantized pixel points in the current coding block is at least one pixel point currently processed by the video decoder. For the convenience of description, it can also be named as a current pixel point in the following embodiments.

Decoding a to-be-decoded video stream can obtain one or more picture frames contained in the video stream. A picture frame includes one or more picture blocks. In the embodiment of the present disclosure, the current coding block corresponds to a picture block of a to-be-processed picture (any picture frame in the video stream), and the coding block can be a coding unit.

In the prior art, the same QP value is used for all pixel points in a coding block (such as the current coding block mentioned above). That is, in the process of dequantization of the current coding block, the QP value is a QP value of a coding block granularity, which will cause great picture distortion. However, in the embodiment of the present disclosure, for a coding block (such as the above-mentioned current coding block), the video decoder determines a QP value for a current pixel point of the coding block, and assigns different QP values to at least two of the pixel points of the coding block. That is, in the process of dequantization of the current coding block, the QP value is a QP value of a pixel granularity, which fully considers differences between different pixel points in the same coding block. By assigning an appropriate QP value to each pixel point, decoding distortion of the picture frame can be reduced, and dequantization effect of the current coding block can be improved (the dequantization effect can be measured by the quality of the decoded picture).

At S502, dequantization is performed on the current pixel point according to a QP value of the current pixel point.

To perform dequantization on the current pixel point, it specifically involves de-quantizing a level of the current pixel point. The level of the current pixel point is obtained by the video decoder by parsing the bit stream.

In the coding process, the video encoder predicts the current coding block, so as to obtain a residual value of the current coding block. The residual value is a difference between a true value of the current coding block and a prediction value of the current coding block, which can be named as a residual coefficient of the current coding block. Then, the residual coefficient of the current coding block is transformed and quantized to obtain a quantization coefficient of the current coding block. Or, the video encoder does not transform the residual coefficient of the current coding block, but directly quantizes the residual coefficient to obtain the quantization coefficient of the current coding block. In this case, the quantization coefficient may be named as a level or a quantized residual coefficient. In an embodiment of the present disclosure, for the convenience of description, quantized values are collectively referred to as levels.

In an embodiment of the present disclosure, performing dequantization on the current pixel point according to a QP value of the current pixel point, which may include: determining a quantization step Qstep of the current pixel point according to the QP value of the current pixel point, then, for a selected quantizer combination, performing dequantization on the level of the current pixel point with the Qstep of the current pixel point.

Optionally, the quantizer is a uniform quantizer or a non-uniform quantizer, and the quantizer combination is determined by label information carried by the bit stream.

According to the QP value, the video decoder can determine Qstep by at least one way of formula derivation or table lookup, and the following three possible implementation methods are provided.

Method 1:

$$Qstep = a \times QP + b,$$

where a and b are preset parameters, for example, a takes 2 and b takes 1.

Method 2:

$$Q_{step} = 2^T$$

where T is an integer related to QP, for example, T=(QP−6)/4.

Method 3:

$$Qstep = 2^{(QP + offset)/octave},$$

where octave is an octave of QP, that is, every time a value of QP increases octave, a value of Qstep doubles, usually octave is 6 or 8, and offset is an integer offset value.

Optionally, traditional scalar quantization methods in H.265 can be used to achieve quantization and dequantization.

quantization:

$$l = \text{sign}(c) * \text{floor}\left(\frac{|c|}{Qstep} + f\right)$$

dequantization:

$$c' = l * Qstep$$

where l is a level obtained after quantization, and c is a to-be-quantized residual coefficient (which can be a residual coefficient in a transformation domain, i.e. a transformed residual coefficient; or the residual coefficient can be a residual coefficient in a pixel domain, i.e., a residual value), Qstep is a quantization step, f is a parameter for controlling rounding, $f \in 0,1$), sign represents a sign function, floor represents a downward rounding function, and c' is a dequantized value.

It can be understood that the larger the QP value and Qstep value, the rougher the quantization, the greater the picture distortion caused by quantization, and the lower the bit rate of coefficient coding.

[0, 1−f) represents a quantization dead zone, and the parameter f is related to a length of the quantization dead zone. The smaller the f is, the longer the quantization dead zone is, and the closer the quantized level is to a zero point. When f=0.5, the above quantization and dequantization formulas are equivalent to rounding, and the quantization distortion is minimal. When f<0.5, the smaller the f, the greater the quantization distortion and the smaller the bit rate of coefficient coding. In H.265, f=⅓ is selected for I frame and f=⅙ for B/P frame.

For example, a quantization or dequantization formula of the uniform quantizer can refer to the above quantization and dequantization formula, and the parameter f can be taken as follows.

Method 1: f is 0.5 or other fixed value.

Method 2: f can be adaptively determined according to QP value, prediction mode and whether to transform or not.

To sum up, through the decoding method provided in the embodiment of the present disclosure, the video decoder can determine the QP value of each pixel point for the coding block, so that each pixel point is dequantized according to the QP value of each pixel point, that is, dequantization is performed pixel point by pixel point. In this way, the decoding distortion of picture frames can be reduced and the authenticity and accuracy of picture decoding can be improved under the condition of ensuring a certain compression rate.

Figure 6:
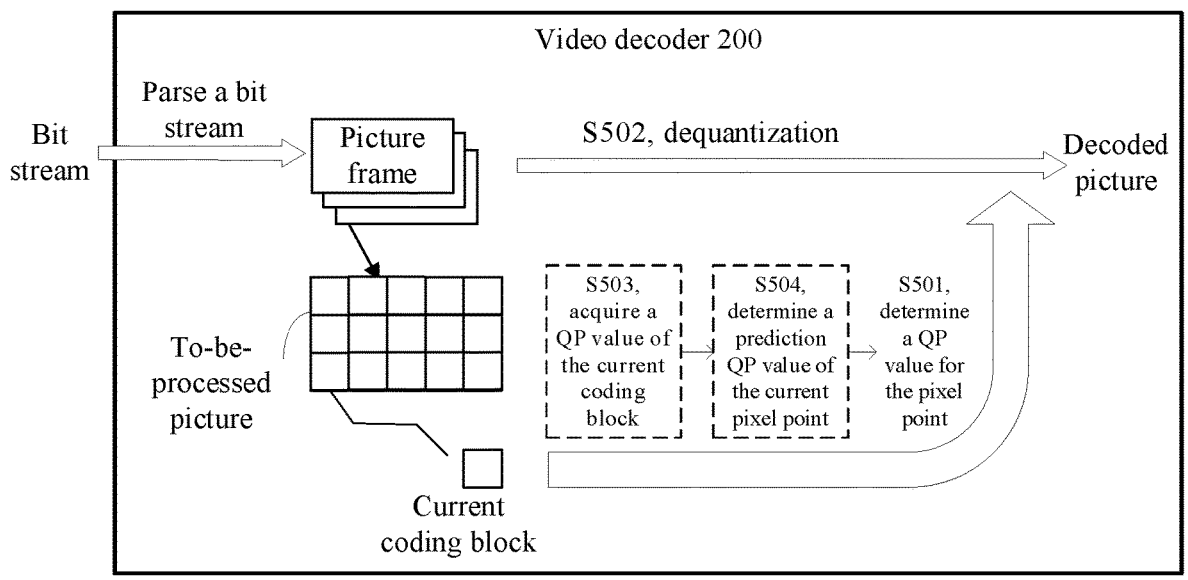
FIG. 6 is a flowchart of a picture decoding method according to an embodiment of the present disclosure.

Optionally, in conjunction with FIG. 5, as shown in FIG. 6, before determining the QP value of the current pixel point, the decoding method provided by embodiments of the present disclosure further includes S503-S504.

At S503, a QP value of the current coding block is acquired.

In an implementation, the QP value of the current coding block can be parsed from the bit stream. In near lossless compression techniques, the probability of occurrence of a small QP is higher than that of a large QP, therefore, the video encoder can directly code the QP value of a coding block by using truncated unary code, truncated Rice code or exponential Columbus code, so that the video decoder can obtain the QP value of the coding block by parsing the bit stream.

In another implementation, the QP value of the current coding block can be acquired through a prediction QP value and a QP offset of the current coding block. For example, the QP value of the current coding block can be acquired in the following way 1 or way 2.

The process of the former implementation includes S1-S3.

At S1, a prediction QP value of the current coding block is acquired.

Optionally, the prediction QP value for the current coding block may be calculated based on QP values of surrounding blocks of the current coding block.

For example, the prediction QP value of the current coding block can be determined according to a QP value of a reconstructed block on a left side and a QP value of a reconstructed block on an upper side of the current coding block, for example:

$$predQP = (QP_A + QP_B + 1) \gg 1$$

predQP represents the prediction QP value of the current coding block, QPA represents the reconstructed block on the left side of the current coding block, QPB represents the reconstructed block on the upper side of the current coding block, and >>1 represents a right shift by one bit, that is, a division by 2 operation.

At S2, the bit stream is parsed to obtain the QP offset of the current coding block.

In the process of video coding, the video encoder determines the prediction QP value of the current coding block, determines a difference between a true QP value of the current coding block and the prediction QP value, obtains the QP offset of the current coding block (which can be notated as deltaQP), then codes the QP offset with variable length code, and transmits the QP offset to the video decoder through the bit stream. Thereby the video decoder, after acquiring the bit stream, can parse the bit stream to obtain the QP offset of the current coding block.

At S3, taking a sum of the prediction QP value of the current coding block and the QP offset as a QP value of the current coding block. i.e., $$QP = predQP + deltaQP,$$

where QP represents the QP value of the current coding, predQP represents the prediction QP value of the current coding block, and deltaQP represents the QP offset of the current coding block.

The process of the latter implementation includes S10-S30.

At S10, a prediction QP value of the current coding block is acquired.

For the description of S10, please refer to the related description of S1, which will not be repeated here.

At S20, a QP offset value of the current coding block is determined according to derived information of the current coding block.

The derived information includes at least one of the following information: flatness information of the current coding block, remaining space of a bit stream buffer or distortion constraint information.

In the process of video coding, the video encoder uses a code control algorithm to derive the QP offset of the current coding block according to the derived information of the current coding block, but the video encoder does not transmit the QP offset in the bit stream. In this way, in the process of video decoding, the video decoder uses the same method as the video encoder to derive the QP offset of the current coding block. The above S20 can adopt any method known to those skilled in the art to derive the QP offset, which is not detailed here.

At S30, taking a sum of the prediction QP value of the current coding block and the QP offset as a QP value of the current coding block.

In the embodiment of the present disclosure, the prediction QP value of the current coding block can also be based on other more information, for example, the QP offset of the current coding block can be derived from a QP of a previous coding block of the current coding block, the number of coded bits of the previous coding block (prevBlockRate), a targetRate, flatness information of the current coding block and a filling degree of the current bit stream buffer (rcFullness).

At S504, the QP value of the current coding block is taken as a prediction QP value of the current pixel point.

The acquired QP value of the current coding block is taken as an initial QP value (i.e., the prediction QP value) of each pixel point of the current coding block, and the QP value of each pixel point is obtained by adjusting or not adjusting the prediction QP value.

Figure 7:
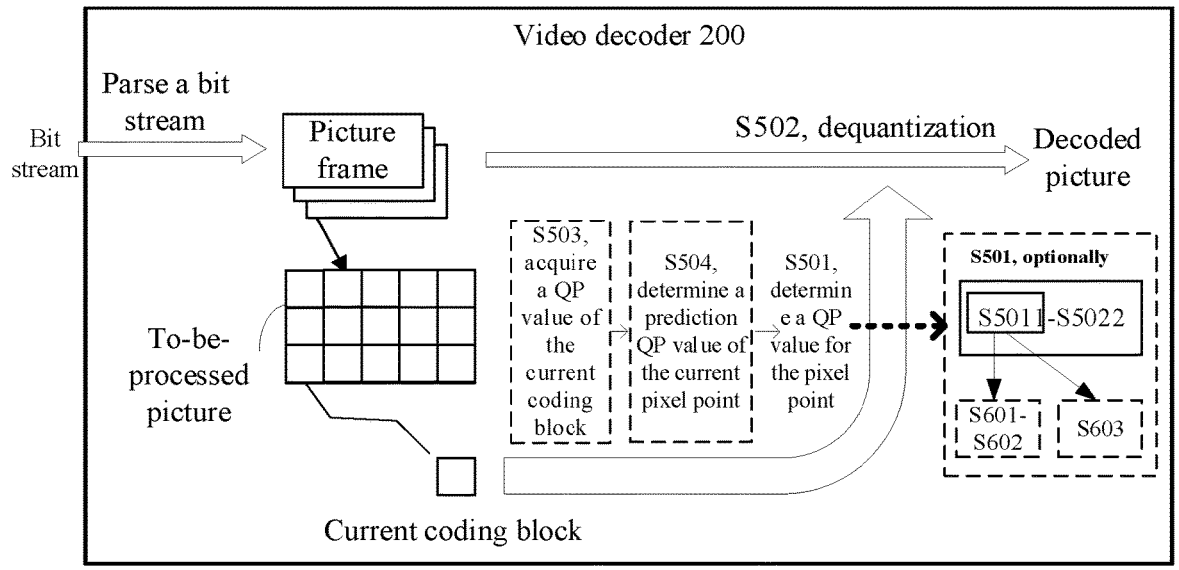
FIG. 7 is a flowchart of a picture decoding method according to an embodiment of the present disclosure.

Based on the above S503-S504, as shown in FIG. 7, the above determination of the QP value of the current pixel point (i.e., S501) specifically includes S5011-S5012.

At S5011, when the current pixel point indicates a target pixel point in the current coding block, the prediction QP value of the current pixel point is adjusted, and the adjusted prediction QP value is taken as the QP value of the current pixel point.

In the embodiment of the present disclosure, the target pixel point is one or more designated pixel points in the current coding block, and these designated pixel points can be understood as pixel points whose QP values are to be adjusted or candidate pixel points. For the candidate pixel points, a QP adjustment strategy is implemented. Regarding the target pixel point, it will be described in detail below.

At S5012, when the current pixel point is a pixel point other than the above-described target pixel point in the current coding block, the prediction QP value of the current pixel point is taken as the QP value of the current pixel point.

In the embodiment of the present disclosure, all pixel points except the target pixel point in the current coding block are not adjusted, and it is not necessary to implement the QP adjustment strategy. For these pixel points, their QP values are the QP values of the current coding block.

As shown in FIG. 7, as an implementation, S5011 in the above embodiment may be realized by S601-S602.

At S601, information of reconstructed pixel points surrounding the current pixel point is acquired.

The reconstructed pixel points surrounding the pixel point can be understood as reconstructed pixel points neighbouring to the current pixel point, including pixel points satisfying following conditions: pixel points in a square region with the current pixel point as a center and a side length being a first preset value; or, pixel points in a diamond-shaped region with the current pixel point as a center and a diagonal length being a second preset value.

The first preset value and the second preset value can be set according to actual needs, and they can be equal or unequal, for example, the first preset value and the second preset value can be 3 or 5.

Figure 8A:
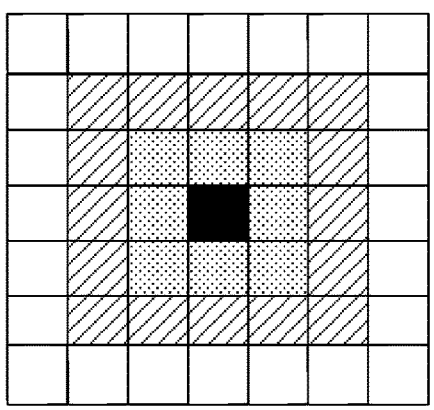
FIGS. 8A and 8B are schematic diagrams of distribution of pixel points according to an embodiment of the present disclosure.

Exemplarily, FIG. 8A shows a schematic diagram of a square region partition centered on the current pixel point as an example, giving 2 possible scenarios: scenario 1, the reconstructed pixel points are pixel points in a square region centered on the current pixel point with a side length of 3, such as surrounding pixel points 1 illustrated in FIG. 8A, and scenario 2, the reconstructed pixel points are pixel points in a square region centered on the current pixel point with a side length of 5, such as surrounding pixel points 2 illustrated in FIG. 8A.

Figure 8B:
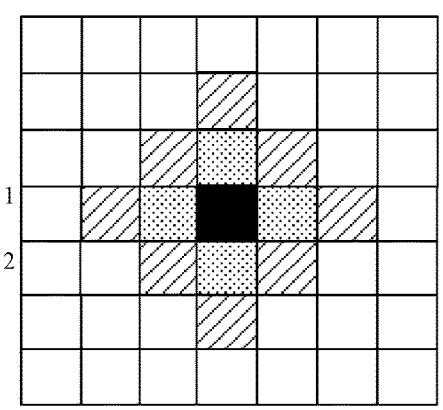

FIG. 8B shows a schematic diagram of a diamond-shaped region partition centered on the current pixel point, giving 2 possible scenarios: scenario 1, the reconstructed pixel points are pixel points in a diamond-shaped region centered on the current pixel point with a diagonal length of 3, such as surrounding pixel points 1 illustrated in FIG. 8B, and scenario 2, the reconstructed pixel point are pixel points in a diamond-shaped region centered on the current pixel point with a diagonal length of 5, such as the surrounding pixel points 2 illustrated in FIG. 8B.

FIGS. 8A and 8B are only examples of embodiments of the present disclosure to illustrate reconstructed pixel points surrounding a current pixel point and should not be construed as limiting the present disclosure. In other possible examples, the reconstructed pixel points surrounding the current pixel point can also refer to one or two pixel points neighbouring to the current pixel point, either vertically or horizontally.

The information of the reconstructed pixel points surrounding the current pixel point may include at least one of following information of the reconstructed pixel points: pixel value, reconstruction residual value, gradient value, flatness information or texture information or complexity information, background luminance, contrast or degree of motion. The reconstruction residual value includes a residual value after dequantization, or a difference between the reconstruction value and the prediction value. The gradient value includes horizontal gradient, vertical gradient, or average gradient. The degree of motion can be expressed by motion vectors.

Further, a value of the information of the reconstructed pixel points includes at least one of: original value, absolute value, mean value or difference value.

In an implementation, a method for acquiring the information of the reconstructed pixel points surrounding the current pixel point may include steps 1 to 2.

At Step 1, information of a prediction pixel point of the current pixel point is acquired.

The predicted pixel point of the current pixel point is a reconstructed pixel point. Optionally, the reconstructed pixel point may be a reconstructed pixel point in the current coding block or a reconstructed pixel point outside the current coding block. For example, when the prediction mode is intra prediction mode, the reconstructed pixel points are pixel points surrounding the coding block in a current picture frame. When the prediction mode is inter prediction mode, the reconstructed pixel points can be a reconstructed block on a reference frame of the current picture frame.

At Step 2, if the prediction pixel point is a reconstructed pixel point in the current coding block, information of the prediction pixel point is taken as the information of the reconstructed pixel points surrounding the pixel point. Otherwise, a difference or an absolute value of the difference between the information of the prediction pixel point and information of reconstructed pixel points surrounding the prediction pixel point is taken as the information of the reconstructed pixel points surrounding the current pixel point.

At S602: the prediction QP value of the current pixel point is adjusted according to the information of the reconstructed pixel points surrounding the current pixel point.

The adjusted prediction QP value is a final QP value of the pixel point.

In the embodiment of the present disclosure, a QP value adjustment parameter table can be set for the current pixel point of the current coding block. For example, Table 1 below shows some parameters required for adjusting the QP value.

TABLE 1

| Parameter name | Meaning |
| --- | --- |
| info | Information of reconstructed pixel points surrounding the current pixel point |
| thres1, thres2 | Thresholds of the information of the reconstructed pixel points, satisfying thres1 <= thres2 |
| maxQP | Maximum value of QP |
| maxAdjustQP | Adjustable maximum QP value, not exceeding maxQP |
| initQP | Initial QP value of the current pixel point, not exceeding maxQP |
| jndQP | Distortion reference QP value, indicating a QP value corresponding to a just noticeable distortion (JND), not exceeding maxQP |
| finalQP | Adjusted prediction QP value, which is also a final QP value used for the current pixel point |
| offset1, offset2 | QP offset values, all zero or positive integer. |
| defaultQP | Preset QP value, not exceeding maxQP, can be taken as 0 or jndQP or other values |
| bdThres | Threshold of bitdepth |

Specifically, S602 includes the following S6021-S6023.

At S6021, if the current pixel point satisfies a second preset condition and a third preset condition, the prediction QP value of the current pixel point is adjusted according to a first QP offset and a distortion reference QP value.

The second preset condition is that the prediction QP value of the current pixel point is greater than the distortion reference QP value, and the prediction QP value of the current pixel point is less than or equal to an adjustable QP maximum value (i.e., maxAdjustQP in Table 1), the adjustable QP maximum value is less than or equal to a QP maximum value. The third preset condition is that the information of the reconstructed pixel points surrounding the current pixel point is less than or equal to a first threshold (i.e., thres1 in Table 1).

Optionally, referring to Table 1, when the current pixel point satisfies the second preset condition and the third preset condition, the adjusted prediction QP value of the current pixel point satisfies:

$$finalQP = \max(initQP - offset1, jndQP)$$

where finalQP represents the adjusted prediction QP value, initQP represents the prediction QP value of the current pixel point, offset1 represents the first QP offset, jndQP represents the distortion reference QP value, and max represents the maximum value.

In a case, the distortion reference QP value is parsed from the bit stream, for example, the bit stream carries the distortion reference QP value, such as 20.

In another case, the distortion reference QP value is derived from flatness information or texture information, background luminance and contrast information of the surrounding reconstructed coding blocks.

In a yet another case, the distortion reference QP value can further be a preset value set by the video encoder or video decoder, such as 15.

That is, the distortion reference QP value may be carried not only in the bit stream, but also derived by the video encoder or video decoder during the video coding and decoding process, or may be a preset value. Embodiments of the present disclosure introduce a distortion reference QP value into a process of determining the QP value of a pixel point, so that each pixel point satisfies judgment information corresponding to just noticeable distortion, which can reduce the picture distortion and thereby improve the subjective quality of the picture.

At S6022, if the current pixel point satisfies the second preset condition and a fourth preset condition, the prediction QP value of the current pixel point is adjusted according to a second QP offset and a QP maximum value.

The fourth preset condition is that the information of the reconstructed pixel points surrounding the current pixel point is greater than a second threshold (i.e., thres2 in Table 1), and the first threshold is less than or equal to the second threshold.

It can be seen that it is necessary to adjust the prediction QP value of the current pixel point in S6021 and S6022.

At S6023, in cases other than S6021 and S6022, the prediction QP value of the current pixel point is taken as the QP value of the current pixel point. That is, there is no need to adjust the prediction QP value of the current pixel.

It can be understood that the above S6023 includes the following situations.

Situation 1: the prediction QP value of the current pixel point is less than or equal to the distortion reference QP value.

Situation 2, the current pixel point satisfies the second preset condition (i.e., the prediction QP value of the current pixel point is greater than the distortion reference QP value and the prediction QP value of the current pixel point is less than or equal to the adjustable QP maximum value), and the information of the reconstructed pixel points surrounding the current pixel point is greater than the first threshold and less than or equal to the second threshold.

Situation 3: the prediction QP value of the current pixel point is greater than the adjustable QP maximum value.

As shown in FIG. 7, as another implementation, S5011 in the above embodiment may be realized by S603.

At S603, if the pixel point satisfies a first preset condition, a preset QP value is taken as the QP value of the current pixel point; otherwise, the prediction QP value of the current pixel point is taken as the QP value of the pixel point.

The first preset condition includes at least one of: the current pixel point is a luma pixel point; the current pixel point is a chroma pixel point; a bit depth of the current pixel point is less than or equal to a bit depth threshold (bdThres in Table 1); the prediction QP value of the current pixel point is less than or equal to an adjustable QP maximum value (maxAdjustQP in Table 1), or the information of the reconstructed pixel points surrounding the current pixel point is less than or equal to a first preset threshold (i.e., thres1 in Table 1).

For example, the first preset condition may be that the current pixel point is a luma pixel point, and the bit depth of the current pixel point is less than or equal to the bit depth threshold. Or, the first preset condition may be that the current pixel point is a chroma pixel point, and the prediction QP value of the current pixel point is less than or equal to the adjustable QP maximum value. Specifically, one or more of the above conditions can be selected and combined as the first preset condition according to the actual demand.

In a possible implementation, the target pixel point indicates any one or more pixel points in the current coding block, i.e., the QP value of each pixel point in the current coding block needs to be adjusted. For each pixel point, the QP value can be determined by using S601-S602 or S603.

In another possible implementation, the target pixel point indicates any one or more pixel points in second part pixel points in the current coding block. In the embodiment of the present disclosure, the current coding block at least includes first part pixel points and/or second part pixel points: the first part pixel points are set as pixel points whose QP values do not need to be adjusted, that is, the QP value of each pixel point in the first part pixel points is its prediction QP value; the second part pixel points are set as the pixel points whose QP values are to be adjusted, that is, the QP value of each pixel point in the second part pixel points is determined by the above S601-S602 or S603.

In another possible implementation, the current coding block at least includes first part pixel points and/or second part pixel points: the first part pixel points are set as pixel points whose QP values do not need to be adjusted, and the second part pixel points are set as the pixel points whose QP values are to be adjusted.

In a possible situation, when a prediction mode of the current coding block is a pixel-wise prediction mode, the second part pixel points may include first position pixel points and/or second position pixel points. The first position pixel points, the second position pixel points are determined according to the pixel-wise prediction mode of the current coding block. Generally, the second position pixel point may include a pixel point corresponding to a starting point of pixel-wise prediction in the horizontal direction.

The target pixel point indicates any one or more pixel points in the first position pixel points, and if the current pixel point is one or more pixel points in the first position pixel points, the QP value of the current pixel point can be determined by using S601-S602. If the current pixel point is one or more pixel points in the second position pixel point, the QP value of the current pixel point can be determined by using S603.

In an embodiment of the present disclosure, among the second part pixel points of the current coding block, which pixel points are set as the first position pixel points and which pixel points are set as the second position pixel points are related to the pixel-wise prediction mode of the current coding block.

As an example, referring to FIGS. 9A to 9D, taking a current coding block of 16×2 (with width w being 16 and height h being 2) as an example, a prediction mode of the coding block is a pixel-wise prediction mode, and the pixel-wise prediction mode of the coding block includes four modes, respectively, pixel-wise prediction mode 1, pixel-wise prediction mode 2, pixel-wise prediction mode 3, and pixel-wise prediction mode 4. Among them, = indicates that a prediction value of a current pixel point is an average value of reconstructed values of pixel points on left and right sides of the pixel point;

||| indicates that a prediction value of a current pixel point is an average value of reconstructed values of pixel points on upper and lower sides of the pixel point;

\> indicates that a prediction value of a current pixel point is a reconstructed value of a pixel point on the left side of the pixel point; and \/ indicates that a prediction value of a current pixel point is a reconstructed value of a pixel point on the upper side of the pixel point.

In an embodiment of the present disclosure, for the convenience of description, pixel points predicted according to the pixel points on its left and right sides are named as a first type of pixel points, pixel points predicted according to its upper and lower sides are named as a second type of pixel points, pixel points predicted according to its left side are named as a third type of pixel points, and pixel points predicted according to its upper side are named as a fourth type of pixel points.

Figure 9A:
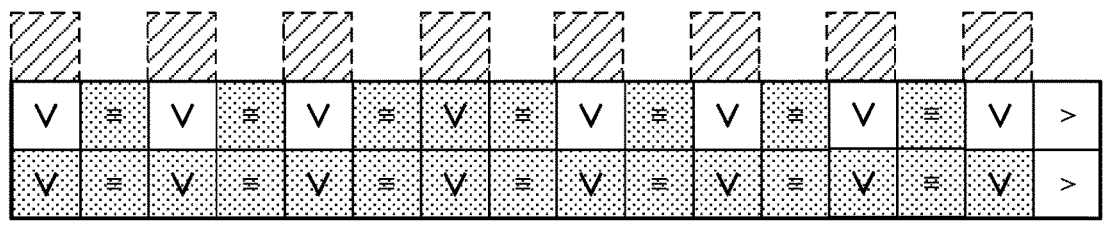
FIGS. 9A to 9D are schematic diagrams of pixel point partition in a pixel-wise prediction mode according to an embodiment of the present disclosure.

As shown in FIG. 9A, the prediction mode of the current coding block is pixel-wise prediction mode 1. As can be seen, the current coding block includes first part pixel points and second part pixel points, and all of the second part pixel points are defined as first position pixel points, i.e., the second part pixel points do not include second position pixel points. The first position pixel points include the first type of pixel points and the fourth type of pixel points.

Figure 9B:
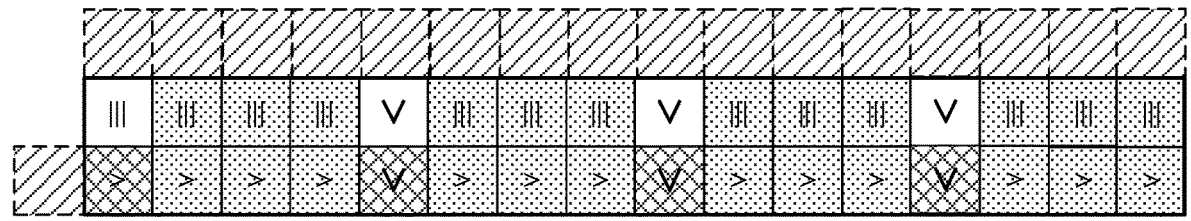

As shown in FIG. 9B, the prediction mode of the current coding block is pixel-wise prediction mode 2. As can be seen, the current coding block includes first part pixel points and second part pixel points, and some of the pixel points in the second part pixel points are defined as first position pixel points and the other as second position pixel points, where the first position pixel points include the second type of pixel points and the third type of pixel points, and the second position pixel points include the third type of pixel points and the fourth type of pixel points.

Figure 9C:
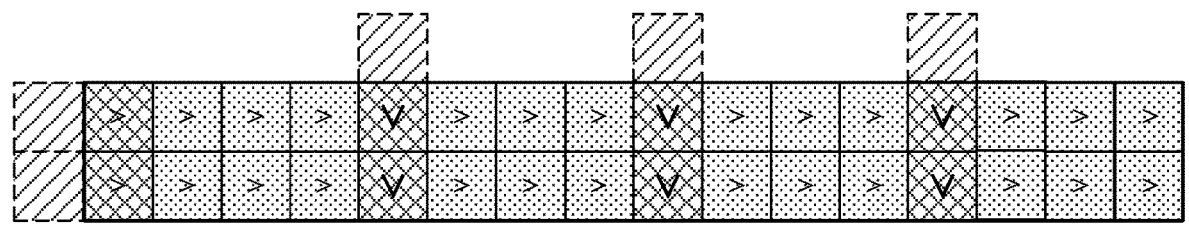

As shown in FIG. 9C, the prediction mode of the current coding block is pixel-wise prediction mode 3, and it can be seen that all of the pixel points of the current coding block are second part pixel points, and some of the pixel points in the second part pixel points are defined as first position pixel points and the other as second position pixel points, where the first position pixel points include the third type of pixel points, and the second position pixel points include the third type of pixel points and the fourth type of pixel points.

Figure 9D:
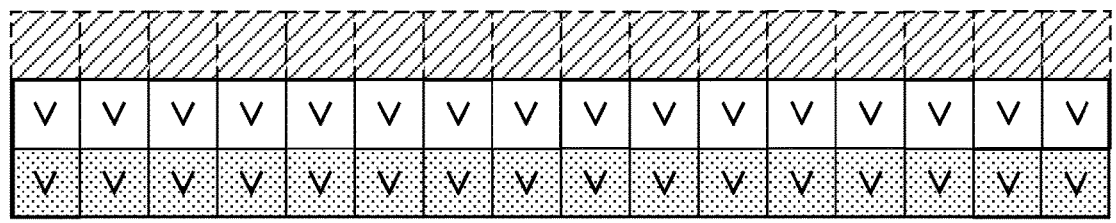

As shown in FIG. 9D, the prediction mode of the current coding block is pixel-wise prediction mode 4. As can be seen, the current coding block includes first part pixel points and second part pixel points, and all of the second part pixel points are defined as first position pixel points, i.e., the second part pixel points do not include second position pixel points. The first position pixel points include the fourth type of pixel points.

Figure 10A:
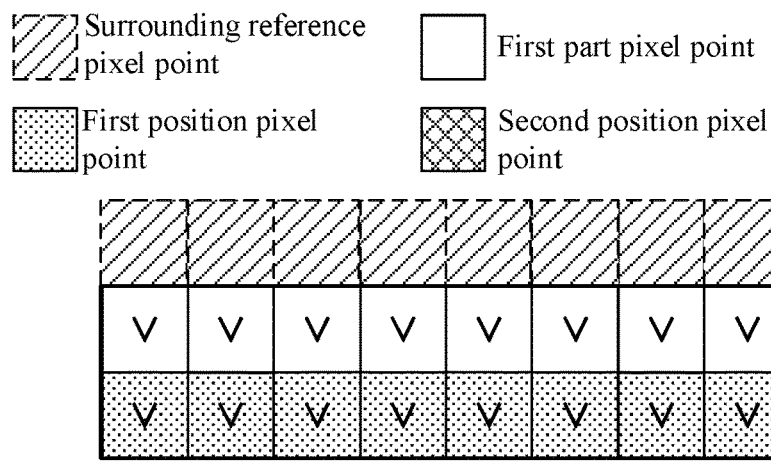
FIGS. 10A and 10B are schematic diagrams of pixel point partition in a pixel-wise prediction mode according to an embodiment of the present disclosure.
Figure 10B:
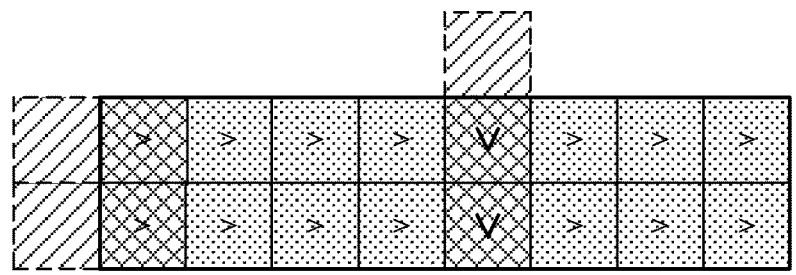

As an example, referring to FIGS. 10A to 10B, taking a current coding block of 8×2 (with width w being 8 and height h being 2) as an example, a prediction mode of the coding block is a pixel-wise prediction mode, and the pixel-wise prediction mode of the coding block includes two modes, respectively, pixel-wise prediction mode 1 and pixel-wise prediction mode 2.

As shown in FIG. 10A, the prediction mode of the current coding block is pixel-wise prediction mode 1. As can be seen, the current coding block includes first part pixel points and second part pixel points, and all of the second part pixel points are defined as first position pixel points, i.e., the second part pixel points do not include second position pixel points. The first position pixel points include the fourth type of pixel points.

As shown in FIG. 10B, the prediction mode of the current coding block is pixel-wise prediction mode 2, and it can be seen that all of the pixel points of the current coding block are second part pixel points, and some of the pixel points in the second part pixel points are defined as first position pixel points and the other as second position pixel points, where the first position pixel points include the third type of pixel points, and the second position pixel points include the third type of pixel points and the fourth type of pixel points.

Figure 11A:
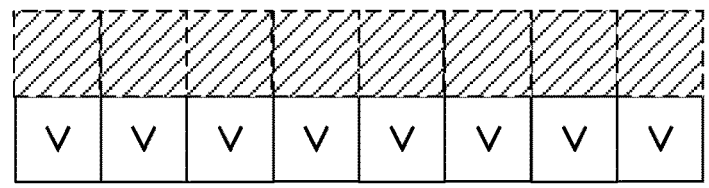
FIGS. 11A and 11B are schematic diagrams of pixel point partition in a pixel-wise prediction mode according to an embodiment of the present disclosure.
Figure 11B:
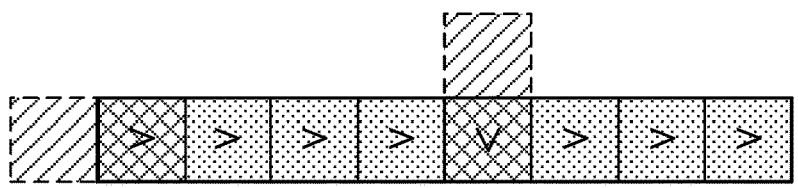

As an example, referring to FIGS. 11A to 11B, taking a current coding block of 8×1 (with width w being 8 and height h being 1) as an example, a prediction mode of the coding block is a pixel-wise prediction mode, and the pixel-wise prediction mode of the coding block includes two modes, respectively, pixel-wise prediction mode 1 and pixel-wise prediction mode 2.

As shown in FIG. 11A, the prediction mode of the current coding block is pixel-wise prediction mode 1. As can be seen, all the pixel points of the current coding block are first part pixel points, and all the first part pixel points are the fourth type of pixel points.

As shown in FIG. 11B, the prediction mode of the current coding block is pixel-wise prediction mode 2, and it can be seen that all of the pixel points of the current coding block are second part pixel points, and some of the pixel points in the second part pixel points are defined as first position pixel points and the other as second position pixel points, where the first position pixel points include the third type of pixel points, and the second position pixel points include the third type of pixel points and the fourth type of pixel points.

Figure 12:
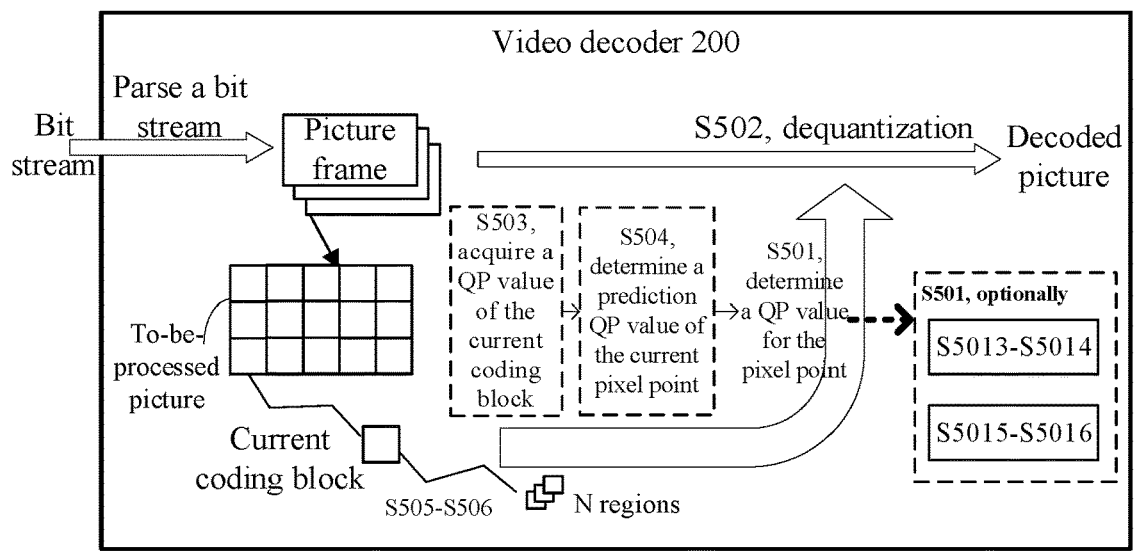
FIG. 12 is a flowchart of a picture decoding method according to an embodiment of the present disclosure.

Referring to FIG. 5, as shown in FIG. 12, in a possible situation, when the prediction mode of the current coding block is a block prediction mode, before determining the QP value of the current pixel point, the decoding method provided by embodiments of the present disclosure further includes S505-S506.

At S505, region partition information of the current coding block is acquired, where the region partition information includes a number of regions N and position information of a region boundary line, and N is an integer greater than or equal to 2.

The region partition information can also be named as a partition template.

Optionally, a method for acquiring region partition information of the current coding block includes: acquiring predefined region partition information of the current coding block; or, parsing a bit stream to acquire the region partition information of the current coding block; or, derived by a video decoder.

At S506, the current coding block is partitioned into N regions according to the region partition information.

Optionally, the block prediction mode may include a block-based inter prediction mode, a block-based intra prediction mode, or an intra bock copy (IBC) prediction mode.

The prediction block of the current coding block is obtained according to the block prediction mode, and then a residual block is obtained. Optionally, from the perspective of whether the residual block is transformed or not, the block prediction mode may include a block prediction mode without transformation and a block prediction mode with transformation. The block prediction mode without transformation means that the residual block determined according to the block prediction mode is not transformed, and the block prediction mode with transformation means that the residual block determined according to the block prediction mode needs to be transformed.

For the block prediction mode without transformation, the pixel points in the current coding block can be reconstructed "pixel-wise" or "region-wise" sequentially, and a QP value of a reconstructed pixel point can be adjusted by using information of a reconstructed pixel point in front.

The pixel-wise reconstruction of pixel points in the current coding block is similar to the above-mentioned pixel-wise prediction mode, so the method for determining QP values of pixel points in the current coding block in the case of "pixel-wise" reconstruction is similar to that in the above-mentioned pixel-wise prediction mode, i.e., the QP values of pixel points in the current coding block can be determined by using the above S601-S602 or S603.

The "region-wise" reconstruction of pixel points in the current coding block allows the pixel points in the same region to be reconstructed in parallel. The idea is to partition the current coding block into N regions (N≥2) and then reconstruct each region sequentially.

Specifically, for the "region-wise" reconstruction mode in the block prediction mode without transformation, the current coding block can be partitioned into N regions according to the number of regions N in the region partition information and position information of a region boundary line. It should be noted that a QP value of a pixel point in at least one region among the N regions is determined according to information of reconstructed pixel points in at least one other region. The other region indicates a region other than the at least one region among the N regions, or a region other than the current coding block. In other words, the N regions are reconstructed in a sequential order, i.e., a reconstruction process between some of the regions in the N regions has a dependency relationship, e.g., it is necessary to reconstruct one region first (the corresponding other region is a region outside of the current coding block), and then reconstruct another region (i.e., the one region is the other region with respect to the another region) on the basis of a reconstruction result of the one region.

Optionally, the number of regions N and the position information of the region boundary line can be derived based on information of the current coding block or information of reference pixels of the current coding block.

As an example, it is assumed that N=2 (i.e., the current coding block is partitioned into two regions), and the current coding block includes a first region and a second region, and a pixel point in the first region includes at least one of: a pixel point in a horizontal slice at any position of the current coding block, a pixel point in a vertical slice at any position, or, a pixel point in a diagonal slice at any position. A width of the slice does not exceed 2, and the width of the slice is equal to 1 in a case that the slice is located at a boundary of the current coding block. A pixel point in the second region is a pixel point in the current coding block other than the first region. The reconstruction sequence of the first region and the second region is to reconstruct the second region first and then the first region.

Exemplarily, for the current coding block, it can be understood that a pixel point on an upper boundary is a pixel point of a slice on an upper side, a pixel point on a lower boundary is a pixel point of a slice on a lower side, a pixel point on a left boundary is a pixel point of a slice on a left side, and a pixel point on a right boundary is a pixel point of a slice on a right side.

Figure 13A:
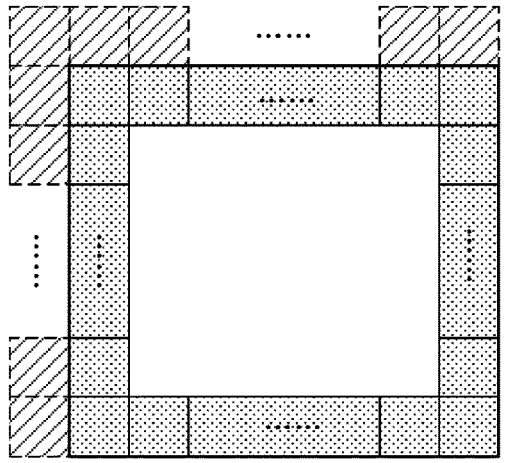
FIGS. 13A to 13D are schematic diagrams of region partition of a coding block according to an embodiment of the present disclosure.
Figure 13B:
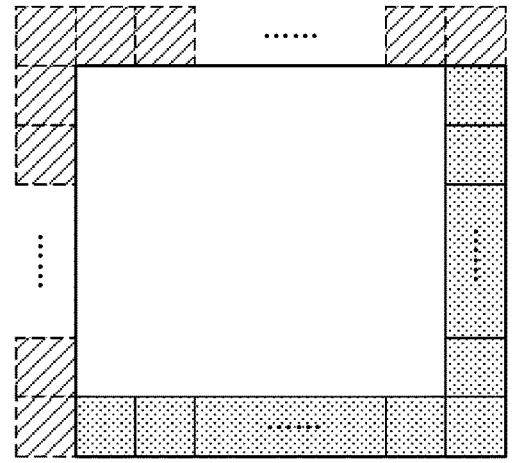
Figure 13C:
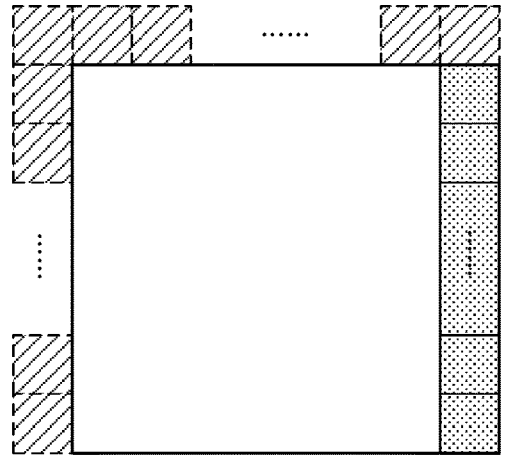
Figure 13D:
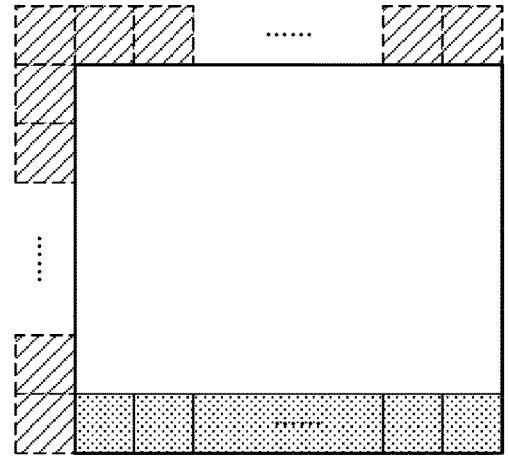

FIGS. 13A to 13D are schematic diagrams of several exemplary partition results of the current coding block. In FIG. 13A, pixel points in the first region include upper, lower, left and right boundary pixel points of the current coding block. In FIG. 13B, pixel points in the first region include lower boundary pixel points and right boundary pixel points of the current coding block. In FIG. 13C, pixel points in the first region include right boundary pixel points of the current coding block. In FIG. 13D, pixel points in the first region include lower boundary pixel points of the current coding block.

For the block prediction mode with transformation, all pixel points within the current coding block need to be reconstructed in parallel, so the current coding block can be partitioned into N regions (N≥2), which in turn reconstructs pixels in the same region in parallel.

Specifically, for the block prediction mode with transformation, the current coding block can be partitioned into N regions according to the number of regions N in the region partition information and position information of a region boundary line.

The number of regions N and the position information of the region boundary line can be derived based on information of the current coding block or information of reference pixels of the current coding block. The region partition information of the current coding block can be determined according to pixel points in an upper neighbouring row and/or pixel points in a left neighbouring column for the current coding block (i.e., reference pixel points of the current coding block). Specifically, an object edge inside the current coding block is predicted according to the pixel points in the upper neighbouring row and/or the pixel points in the left neighbouring column of the current coding block, and then the current coding block is partitioned into several regions based on the object edge. For example, according to the pixel points in the upper neighbouring row and/or the pixel points in the left neighbouring column of the current coding block, a gradient algorithm is adopted to predict pixel points whose pixel values in the row and/or column of the current coding block are abrupt, so that the abrupt pixel points can be taken as a position of the region boundary line, and the number of regions N can be determined accordingly.

The region partition information of the current coding block determined by the above method can enable the region partition manner of the current coding block include at least one of the following: horizontal partition, vertical partition or diagonal partition. For example, when there are one or more abrupt pixel points in row pixel values of the current coding block and no abrupt pixel points in column pixel values, the region partition manner of the current coding block is vertical partition. When there are one or more abrupt pixel points in the column pixel values of the current coding block and no abrupt pixel points in the row pixel values, the region partition manner of the current coding block is horizontal partition. When there are one or more abrupt pixel points in the row pixel values and one or more abrupt pixel points in the column pixel values of the current coding block, the region partition manner of the current coding block is diagonal partition.

Figures 14A, 14B, 14C:
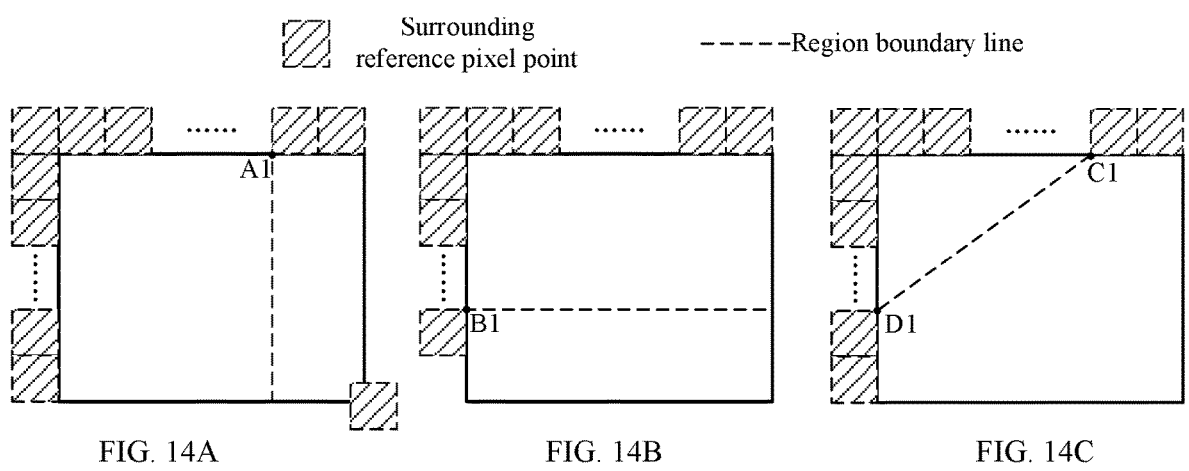
FIGS. 14A to 14C are schematic diagrams of region partition of a coding block according to an embodiment of the present disclosure.

Referring to FIGS. 14A to 14C, one partition manner is to partition the current coding block into two regions. FIG. 14A schematically shows that the current coding block is vertically partitioned into two regions, with point A1 being an abrupt pixel point of the line. FIG. 14B schematically shows that the current coding block is horizontally partitioned into two regions, with point B1 being an abrupt pixel point of the column. FIG. 14C schematically shows that the current coding block is diagonally partitioned into two regions, with point C1 being an abrupt pixel point of the row and point D1 being an abrupt pixel point of the column.

Figure 15A:
FIGS. 15A to 15E are schematic diagrams of region partition of a coding block according to an embodiment of the present disclosure.
Figure 15A:
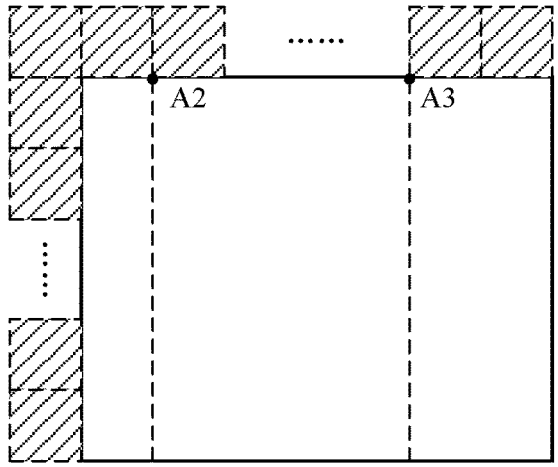
Figure 15B:
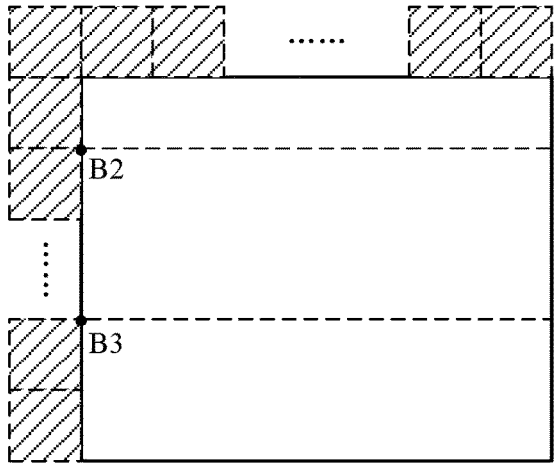
Figure 15C:
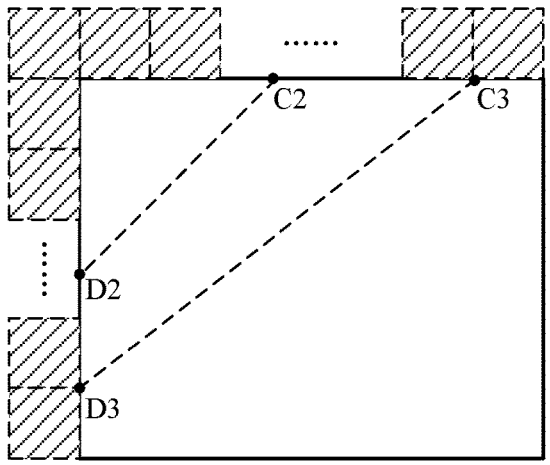
Figure 15D:
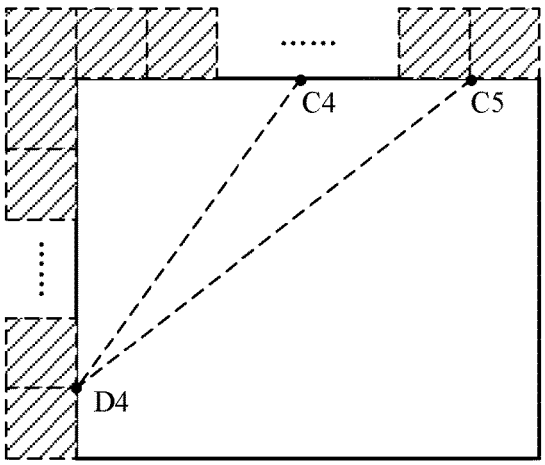
Figure 15E:
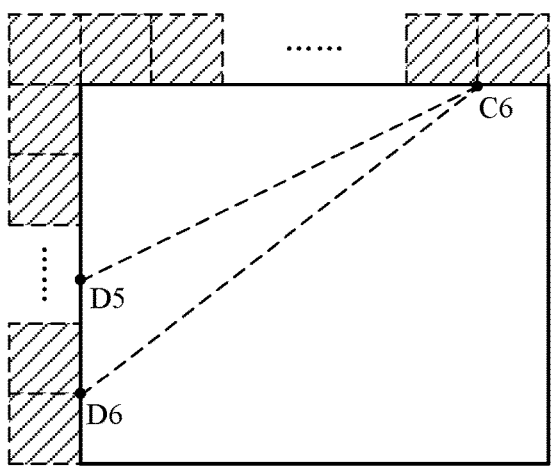

Referring to FIGS. 15A to 15E, one partition manner is to partition the current coding block into three regions. FIG. 15A schematically shows that the current coding block is vertically partitioned into three regions, with point A2 and point A3 being abrupt pixel points of the line. FIG. 15B schematically shows that the current coding block is horizontally partitioned into two regions, with point B2 and point B3 being abrupt pixel points of the column. FIGS. 15C to 15E schematically show that the current coding block is diagonally partitioned into three regions, where in FIG. 15C, point C2 and point C3 are abrupt pixel points of the row, and point D2 and point D3 are abrupt pixel points of the column, in FIG. 15D, point C4 and point C5 are abrupt pixel points of the row, and point D4 is an abrupt pixel point of the column, and in FIG. 15E, point C6 is an abrupt pixel point of the row, and point D5 and point D6 are abrupt pixel points of the column.

FIG. 14A to FIG. 14C and FIG. 15A to FIG. 15E are only examples of some of results of the partition of the current coding block and should not be taken as a limitation of the embodiments of the present disclosure, and the partition manner of the current coding block may also be a combination of multiple partition manners.

Based on the above S505-S506, in an implementation, for the block prediction mode without transformation, take the current coding block is partitioned into two regions (i.e., N=2) as an example, that is, the current coding block includes a first region and a second region (refer to FIGS. 10A and 10B), as shown in FIG. 12, the above determination of the QP value of the current pixel point (i.e., S501) specifically includes S5013-S5014.

At S5013, when the current pixel point indicates any one pixel point in the first region, the prediction QP value of the current pixel point is adjusted, and the adjusted prediction QP value is taken as the QP value of the current pixel point.

Specifically, information of the reconstructed pixel surrounding the current pixel point is acquired, and then the prediction QP value of the pixel point is adjusted according to the information of the reconstructed pixel points surrounding the current pixel point. The specific process can refer to the related descriptions of S601-S602 in the above-mentioned embodiment (where S602 includes S6021-S6023), and will not be repeated here.

At S5014, when the current pixel point indicates any one pixel point in the second region, the prediction QP value of the current pixel point is taken as the QP value of the current pixel point. Since it is necessary to reconstruct the pixel points in the second region first, there may be no reconstructed pixel points surrounding it at this time, so the prediction QP values of the pixel points in the second region are not adjusted, i.e., the prediction QP values of the pixel points in the second region are taken as the QP values of the pixel points.

In another implementation, for the block prediction mode with transformation, for the current pixel point in any one of N regions, as shown in FIG. 12, the above determination of the QP value of the current pixel point (i.e., S501) specifically includes S5015-S5016.

At S5015, a QP offset of the current pixel point is acquired.

Optionally, a bit stream is parsed to acquire an offset of the current pixel point. It can be understood that during the process of coding a picture by a video encoder, after predicting the QP offset of each pixel point, the video encoder can code the QP offset of each pixel point into the bit stream and transmit it to the video decoder.

Or, optionally, the QP offset of the current pixel point is determined according to the derived information. The derived information includes index information of a region where the current pixel point is located and/or a distance from the current pixel point to a region boundary line of the region where the current pixel point is located. The distance includes any one of: a horizontal distance, a vertical distance or a Euclidean distance.

Therefore, the derived QP offset of the current pixel point is any of the following: a third QP offset, a fourth QP offset, and a sum of the third QP offset and the fourth QP offset.

The third QP offset is derived from the index information of the region where the current pixel point is located, and the third QP offset can be regarded as a region-level QP offset. It should be understood that the third QP offset of the pixel point in a same region is the same, and the third QP offset of the pixel point in different regions is different.

The fourth QP offset is derived from the distance between the current pixel point and the region boundary line of the region where the current pixel point is located. The fourth QP offset can be regarded as a pixel-level QP offset, and the QP offset of the current pixel point can be different if a corresponding distance of the pixel point is different.

One of the third QP offset, the fourth QP offset and the sum of the third QP offset and the fourth QP offset can be selected as the QP offset of the pixel point according to a configuration of the video encoder side.

At S5016, a prediction QP value of the current pixel point is adjusted according to the QP offset of the current pixel point, and the adjusted prediction QP value is taken as the QP value of the current pixel point.

To sum up, the video decoder can determine the QP value of pixel point granularity for the pixel points in the coding block, so as to dequantize each pixel point on a pixel-wise basis according to the QP value of each pixel point. In this way, the decoding distortion of picture frames can be reduced and the authenticity and accuracy of picture decoding can be improved under the condition of ensuring a certain compression rate.

Accordingly, in the picture coding method, the video encoder first acquires QP, Qstep and residual coefficient of the pixel point, then adaptively selects a quantizer to quantize the residual coefficient, and finally adjusts a quantization coefficient to obtain a final level, thus realizing the coding of the picture frame.

Figure 16:
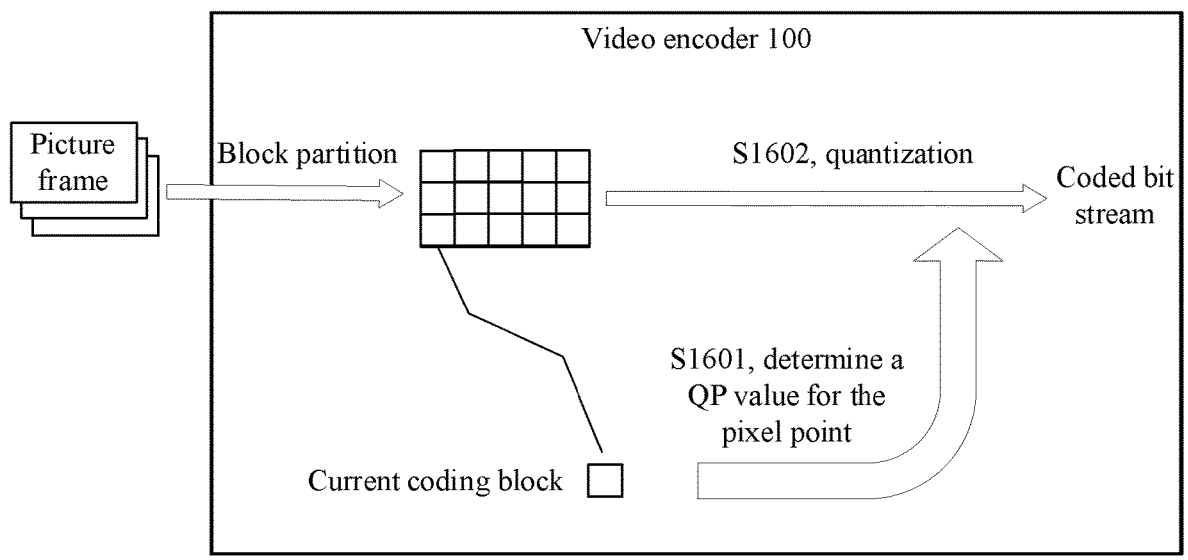
FIG. 16 is a flowchart of a picture coding method according to an embodiment of the present disclosure.

Based on the video encoder 100 illustrated in FIG. 2, the present disclosure further provides a picture coding method. As shown in FIG. 16, FIG. 16 is a flowchart of a picture coding method according to an embodiment of present disclosure. This picture coding method can be executed by the video encoder 100 or by a coding terminal (such as the coding side 10 shown in FIG. 1) that supports the functions of the video encoder 100. Here, the coding method realized by the video encoder 100 is described as an example, and the picture coding method includes the following steps.

At S1601, for at least one pixel point which indicates one pixel point or a plurality of parallel quantized pixel points in a current coding block, a QP value for the at least one pixel point is determined.

At least two pixel points in the current coding block are of different QP values.

At S1602, quantization is performed on the at least one pixel point according to the QP value of the at least one pixel point.

Quantization is an inverse process of dequantization, and with respect to the quantization of the QP value in the coding method, reference can be made to the corresponding processes in the decoding method in FIGS. 5 to 15A, and to FIG. 15E above, which will not be repeated here.

To sum up, through the coding method provided in the embodiment of the present disclosure, the coder can determine the QP value of each pixel point for the coding block, so that each pixel point is quantized according to the QP value of each pixel point, that is, quantization is performed pixel point by pixel point. In this way, the decoding distortion of picture frames can be reduced and the authenticity and accuracy of picture decoding can be improved under the condition of ensuring a certain compression rate.

It can be understood that for the block prediction mode, the current coding block is partitioned into N (N≥2) regions according to the method described in the embodiment, and the pixel points in each region are quantized pixel points by pixel points or a plurality of pixel points are quantized in parallel to obtain a level (i.e., a quantized residual coefficient or quantized parameter coefficient), and then the parameter coefficient is coded.

For the case that the coding block is partitioned into N regions, the QP values in different regions can be adjusted in different ways, so a distribution of quantized residual coefficients is also different, so a region-based residual block coding method can be designed.

Specifically, residual coefficients of each region can be partitioned into several residual groups, and it should be noted that each residual group cannot cross regions. Then, a code length parameter of a residual group is coded, and the coding method can be fixed-length code or variable-length code. Then each residual coefficient in the residual group is coded by a fixed-length code, a code length of the fixed-length code is determined by the code length parameter of the residual group, and the code length parameter of different residual groups can be different.

Figure 17:
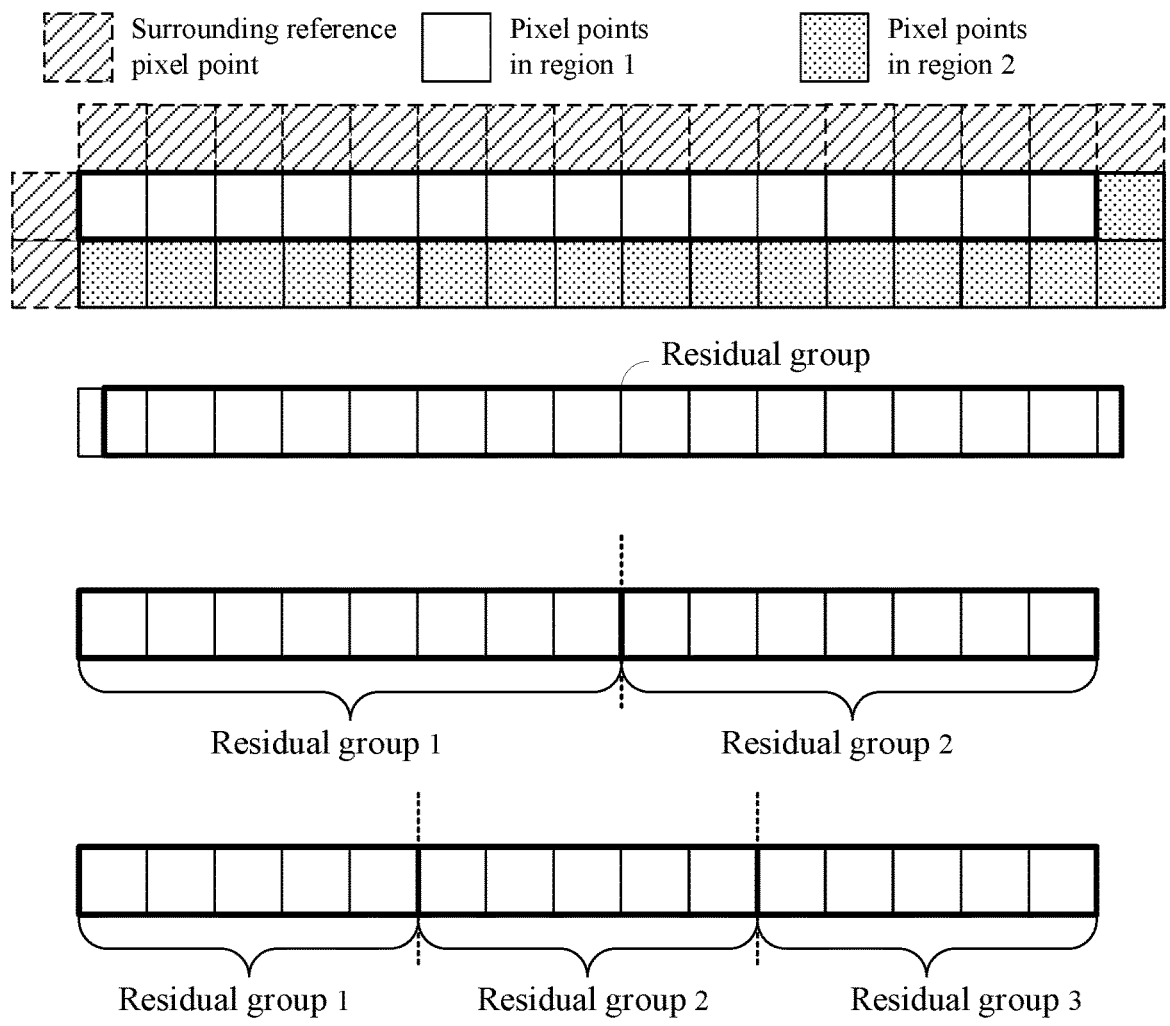
FIG. 17 is a schematic diagram for partitioning a residual group according to an embodiment of the present disclosure.

For example, referring to FIG. 17, assuming that the current coding block is a 16×2 coding block, and the current coding block is partitioned into two regions, namely region 1 and region 2, residual coefficients corresponding to region 1 can be partitioned into n (n≥1) residual groups, and residual coefficients corresponding to region 2 can be partitioned into m (m≥1) residual groups, and each residual group does not cross regions. It should be understood that the parameter coefficients correspond to pixel points one by one, and grouping the parameter coefficients corresponding to a region means grouping the pixel points included in the region. As shown in FIG. 17, region 1 includes 15 pixel points, exemplarily, the region 1 may be partitioned into 1 residual group, i.e., the 15 pixel points are partitioned into one residual group; the region 1 may also be partitioned into come 2 residual groups, e.g., the first 8 pixel points of the region 1 are partitioned into one residual group 1, and the last 7 pixel points of the region 1 are partitioned into another residual group 2; and the region 1 may be partitioned into 3 residual groups, e.g., each of the 5 neighbouring pixel points are partitioned into a residual group to obtain three residual groups, such as residual group 1, residual group 2 and residual group 3.

Optionally, the prediction mode in which the video encoder predicts the current coding block may include a pixel-wise prediction mode, a block prediction mode. The block prediction mode may be a block inter prediction mode, a block intra prediction mode, or an intra bock copy (IBC) prediction mode. The following is a brief introduction to the IBC prediction model.

IBC technology is to search a matching block of the current coding block in the reconstructed region of the current frame, with the purpose of removing a non-local redundancy of space. A prediction process in IBC prediction mode can be partitioned into two processes: motion estimation and motion compensation. Motion estimation is that the coding side searches for the matching block of the current coding block, estimates a relative displacement between the current coding block and its matching block, i.e., a block vector (BV) or block vector difference (BVD) corresponding to the current coding block, and transmits the BV or BVD in a bit stream. Motion compensation is to generate a prediction block according to the matching block, including, for example, operations such as weighting the matching block and prediction filtering.

Optionally, the method for the video encoder to obtain the prediction block of the current coding block may include the following.

Method 1: if pixel points in the prediction block are not available, allow padding with pixel points on the upper or left side, or padding to a default value.

Method 2: based on the matching block obtained by BV or BVD, the matching block is processed (such as prediction filtering and illumination compensation) to generate a final prediction block.

Optionally, in the IBC prediction mode, the video encoder partitions the current coding block into several transform blocks (TB) and several prediction blocks (PB), where one TB may include one or more PBs. Exemplarily, referring to FIG. 18, taking the current coding block as a 16×2 coding block as an example, the current coding block is partitioned into 2 TBs, TB1 and TB2, respectively, with the size of both TB1 and TB2 being 8×2, and each TB includes 4 PBs, with the size of each PB being 2×2, and then reconstructs each TB in turn. A pixel reconstruction method is: starting from a second TB of the current coding block, reconstructed pixel values of a reconstructed TB on a left side of the current TB can be referenced when performing motion compensation for PBs in each TB.

Optionally, the video encoder codes BV or BVD in the following method 1 and/or method 2.

Method 1: for a horizontal-only motion search, only a horizontal BV or BVD is transmitted in the bit stream, and there is no need to transmit a vertical BV or BVD.

Method 2: the coding method of BV or BVD can be fixed-length code or variable-length code.

A code length of the fixed-length code or a binarization manner of the variable-length code may be obtained based on one or more of the following information: position information of the current coding block, size information (including width or height or area), partition mode information or partition manner of TB/PB; position information or size information (including width or height or area) of a current TB, or position information or size information (including width or height or area) of a current PB.

Optionally, the step of acquiring the current coding block may be: first acquiring a block vector prediction (BVP) and then acquiring BVD, then BV=BVP+BVD.

BVP can be acquired based on one or more of the following information: BV or BVD of a coding block, position information, size information (including width or height or area), partition mode information or partition manner of TB/PB, or BV or BVD, position information or size information (including width or height or area) of surrounding prediction blocks.

It can be understood that in order to realize the functions in the above-mentioned embodiments, the video encoder/video decoder includes corresponding hardware structures and/or software modules for performing various functions. Those skilled in the art should easily realize that the present disclosure can be implemented in hardware or in the form of a combination of hardware and computer software in combination with the example units and method steps described in the embodiments disclosed in the present disclosure. Whether a function is executed by hardware or computer software drives hardware depends on the specific application scenarios and design constraints of the technical solution.

Figure 19:
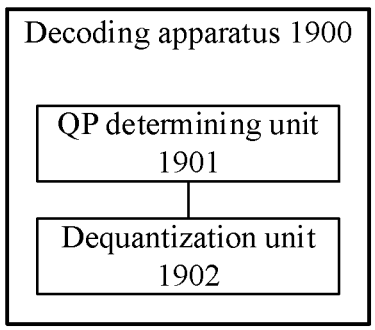
FIG. 19 is a schematic structure of a decoding apparatus according to the present disclosure.

FIG. 19 is a schematic structure of a decoding apparatus according to an embodiment of the present disclosure. The decoding apparatus 1900 includes a QP determining unit 1901 and a dequantization unit 1902. The decoding apparatus 1900 can be configured to realize the functions of a video decoder or a decoding side in the above-mentioned decoding method embodiment, so it can also achieve the beneficial effects of the above-mentioned decoding method embodiment. In the embodiment of the present disclosure, the decoding apparatus 1900 may be a decoding side 20 or a video decoder 200 as shown in FIG. 1, a video decoder 200 as shown in FIG. 3, or a module (such as a chip) applied to the decoding side 20 or the video decoder 200.

A QP determining unit 1901 and a dequantization unit 1902 are configured to realize the decoding method provided in any one of the embodiments in FIGS. 5 to 15A to 15E. A detailed description of the QP determining unit 1901 and the dequantization unit 1902 can be directly obtained by referring to the relevant descriptions in the method embodiments shown in FIGS. 5 to 15A to 15E, and will not be repeated here.

Figure 20:
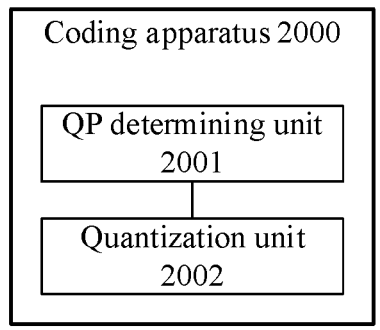
FIG. 20 is a schematic structural diagram of a coding apparatus according to the present disclosure.

FIG. 20 is a schematic structure of a decoding apparatus according to an embodiment of present disclosure. The coding apparatus 2000 includes: a QP determining unit 2001 and a quantization unit 2002. The coding apparatus 2000 can be configured to realize the functions of a video encoder or a coding side in the above-mentioned coding method embodiment, so it can also achieve the beneficial effects of the above-mentioned coding method embodiment. In the embodiment of the present disclosure, the coding apparatus 2000 may be a coding side 10 or a video encoder 100 as shown in FIG. 1, a video encoder 100 as shown in FIG. 2, or a module (such as a chip) applied to the coding side 10 or the video encoder 100.

Figure 18:
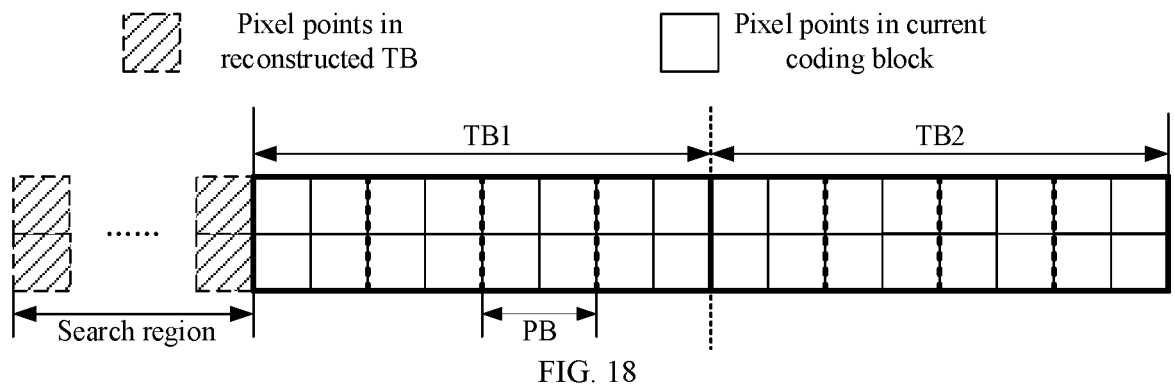
FIG. 18 is a schematic diagram of a TB/PB partition according to an embodiment of the present disclosure.

The QP determining unit 2001 and quantization unit 2002 are configured to realize the coding methods provided in FIGS. 16 to 18. A more detailed description of the QP determining unit 2001 and the quantization unit 2002 can be directly obtained by referring to the relevant descriptions in the method embodiments shown in FIGS. 4 to 18, and will not be repeated here.

Figure 21:
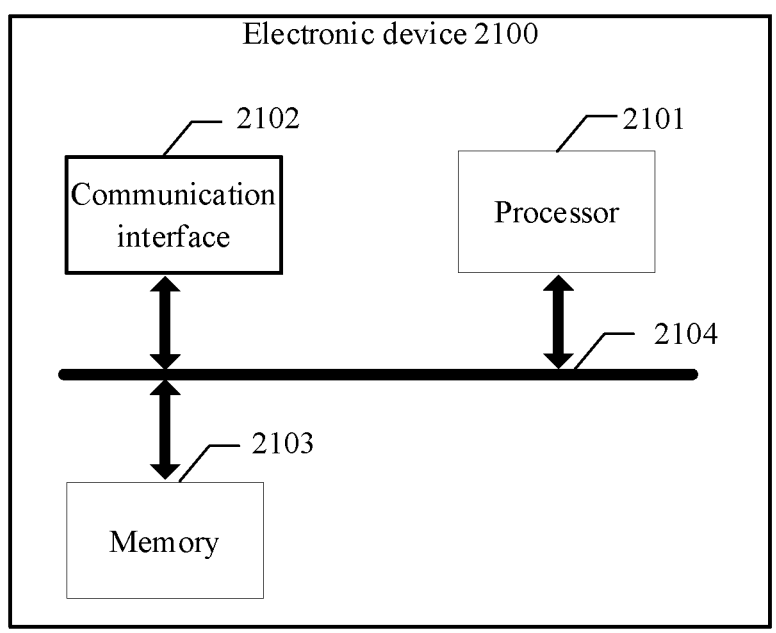
FIG. 21 is a schematic structural diagram of an electronic device according to the present disclosure.

The present disclosure further provides an electronic device, as shown in FIG. 21, which is a schematic structural diagram of an electronic device provided by the present disclosure. The electronic device 2100 includes a processor 2101 and a communication interface 2102. The processor 2101 and the communication interface 2102 are coupled to each other. It can be understood that the communication interface 2101 can be a transceiver or an input-output interface. Optionally, the electronic device 2100 may further include a memory 2103 for storing instructions executed by the processor 2101 or input data required by the processor

2101 to run the instructions, or data generated after the processor 2101 runs the instructions.

When the electronic device 2100 is configured to implement the method shown in FIGS. 5 to 15A to 15E, the processor 2101 and the interface circuit 2102 are configured to perform the functions of the QP determination unit 1901 and the dequantization unit 1902 described above.

When the electronic device 2100 is configured to implement the method shown in FIGS. 16 to 18, the processor 2101 and the interface circuit 2102 are configured to perform the functions of the QP determination unit 2001 and the quantization unit 2002 described above.

A specific connection medium among the communication interface 2102, the processor 2101 and the memory 2103 is not limited in the embodiment of the present disclosure. In the embodiment of the present disclosure, the communication interface 2102, the processor 2101 and the memory 2103 are connected by a bus 2104 in FIG. 21, and the bus is indicated by a thick line in FIG. 21. Connection modes of other components are only for schematic illustration and are not limited. The bus can be partitioned into address bus, data bus, control bus, etc. For convenience of representation, only one thick line is used in FIG. 21, but it does not mean that there is only one bus or one type of bus.

The memory 2103 can be configured to store software programs and modules, such as program instructions/modules corresponding to the decoding method or coding method provided by the embodiments of the present disclosure. The processor 2101 executes various functional applications and data processing by executing the software programs and modules stored in the memory 2103. The communication interface 2102 can be configured to communicate signaling or data with other devices. In the present disclosure, the electronic device 2100 may have a plurality of communication interfaces 2102.

It can be understood that the processor in the embodiment of the present disclosure can be a central processing Unit (CPU), a neural processing unit (NPU) or a graphic processing unit (GPU), or may be other general-purpose processors, a digital signal processor (DSP), an application specific integrated circuit (ASIC), a field programmable gate array (FPGA), or other programmable logic devices, a transistor logic device, a hardware component or any combination thereof. The general-purpose processor can be a microprocessor or any conventional processor.

The method steps in the embodiment of the present disclosure can be realized by hardware, or by a processor executing software instructions. Software instructions can be composed of corresponding software modules, which can be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a mobile hard disk, a CD-ROM, or any other form of storage media known in the art. An exemplary storage medium is coupled to a processor such that the processor is capable of reading information from the storage medium and may write information to the storage medium. The storage medium can also be an integral part of the processor. The processor and the storage medium can be located in an ASIC. In addition, the ASIC can be located in a network device or a terminal device. The processor and the storage medium can also exist as separate components in the network device or the terminal device.

In the above embodiments, it can be realized in whole or in part by software, hardware, firmware or any combination thereof. When implemented using a software program, it may be implemented in whole or in part in the form of a computer program product. The computer program product includes one or more computer instructions. When the computer program is loaded and executed on a computer, the flow or function according to the embodiments of the present disclosure is generated in whole or in part. The computer can be a general-purpose computer, a special-purpose computer, a computer network, or other programmable devices. The computer instructions can be stored in a computer-readable storage medium or transmitted from one computer-readable storage medium to another. For example, the computer instructions can be transmitted from a website, computer, server or data center to another website by wired (e.g., coaxial cable, optical fiber, digital subscriber line (DSL)) or wireless (e.g., infrared, wireless, microwave, etc.). The computer-readable storage medium may be any available medium that can be accessed by a computer or a data storage device such as a server, data center, etc. that contains one or more available media integrated. The available media may be a magnetic medium (e.g., floppy disk, magnetic disk, magnetic tape), an optical medium (e.g., digital video disc (DVD)), or a semiconductor medium (e.g., solid state drives (SSD)), etc.

Through the description of the above implementations, it can be clearly understood by those skilled in the art that for the convenience and conciseness of description, only the partition of the above functional modules is taken as an example. In practical application, the above functional allocation can be completed by different functional modules as required, that is, the internal structure of the apparatus is partitioned into different functional modules to complete all or part of the functions described above. The specific working processes of the above-described systems, apparatuses, and units can be referred to the corresponding processes in the foregoing embodiments of the method, and will not be repeated herein.

In several embodiments provided by the present disclosure, it should be understood that the disclosed systems, apparatuses and methods can be realized in other ways. For example, the apparatus embodiment described above is only schematic. For example, the partition of the module or unit is only a logical function partition. In actual implementation, there may be another partition manner, for example, multiple units or components can be combined or integrated into another system, or some features can be ignored or not implemented. On the other hand, the mutual coupling or direct coupling or communication connection shown or discussed can be indirect coupling or communication connection through some interfaces, apparatuses or units, which can be electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of this embodiment.

In addition, each functional unit in each embodiment of the present disclosure can be integrated into one processing unit, or each unit can exist physically alone, or two or more units can be integrated into one unit. The above integrated units can be realized in the form of hardware or software functional units.

The integrated unit can be stored in a computer-readable storage medium if it is realized in the form of a software functional unit and sold or used as an independent product. Based on this understanding, the technical solution of the present disclosure may be embodied essentially or in part as a contribution to the prior art, or all or part of the technical solution may be embodied in the form of a software product, which is a computer software product stored in a storage medium including a number of instructions to cause a computer device (which may be a personal computer, a server, or a network device, etc.) or a processor to carry out all or part of the steps of the method described in the various embodiments of the present disclosure. The aforementioned storage media include flash memory, mobile hard disk, read-only memory, random access memory, magnetic disk or optical disk and other media that can store program codes.

The above is only the specific implementation of the present disclosure, but the protection scope of the present disclosure is not limited to this, and any change or replacement within the technical scope disclosed in the present disclosure should be covered by the present disclosure. Therefore, the scope of protection of the present disclosure based on the scope of protection of the claims.

The invention claimed is:

1. A picture decoding method, performed by a decoding device, comprising:
   determining, for any at least one pixel point which indicates one pixel point or a plurality of parallel dequantized pixel points in a current coding block, a quantization parameter (QP) value for the at least one pixel point, wherein at least two pixel points in the current coding block have different QP values;
   performing dequantization on the at least one pixel point according to the QP value of the at least one pixel point;
   acquiring a OP value of the current coding block; and
   taking the OP value of the current coding block as a prediction OP value of the at least one pixel point;
   wherein determining the QP value of the at least one pixel point comprises:
      when the at least one pixel point indicates any one target pixel point or any plurality of parallel dequantized target pixel points in the current coding block, adjusting the prediction QP value of the at least one pixel point, and taking the adjusted prediction QP value as the QP value of the at least one pixel point, and
   wherein adjusting the prediction OP value of the at least one pixel point comprises:
      acquiring information of reconstructed pixel points surrounding the at least one pixel point; and
      adjusting the prediction QP value of the at least one pixel point according to the information of the reconstructed pixel points surrounding the at least one pixel point.

2. The method according to claim 1, wherein adjusting the prediction QP value of the at least one pixel point comprises:
   if the at least one pixel point satisfies a first preset condition, taking a preset QP value as the QP value of the at least one pixel point; and
   otherwise, taking the prediction QP value of the at least one pixel point as the QP value of the at least one pixel point,
   wherein the first preset condition comprises at least one of:
      the at least one pixel point is a luma pixel point;
      the at least one pixel point is a chroma pixel point;
      a bit depth of the at least one pixel point is less than or equal to a bit depth threshold;
      the prediction QP value of the at least one pixel point is less than or equal to an adjustable QP maximum value, and the adjustable QP maximum value is less than or equal to a QP maximum value; or
      the information of the reconstructed pixel points surrounding the at least one pixel point is less than or equal to a first preset threshold.

3. The method according to claim 1, wherein performing dequantization on the at least one pixel point according to the QP value of the at least one pixel point comprises:
   performing dequantization on the at least one pixel point according to the adjusted prediction QP value.

4. The method according to claim 1, wherein, the target pixel point indicates any one or more pixel points in the current coding block.

5. The method according to claim 1, wherein,
   the current coding block at least comprises at least one of first part pixel points and second part pixel points, and
   the target pixel point indicates any one or more pixel points in the second part pixel points.

6. The method according to claim 5, wherein,
   the target pixel point indicates any one or more pixel points among first position pixel points in the second part pixel points.

7. The method according to claim 5, wherein,
   the target pixel point indicates any one or more pixel points among second position pixel points in the second part pixel points.

8. The method according to claim 1, wherein,
   a prediction mode of the current coding block is a pixel-wise prediction mode,
   the current coding block at least comprises at least one of first part pixel points and second part pixel points,
   the second part pixel points comprise at least one of first position pixel points and second position pixel points, and
   the first position pixel points, the second position pixel points are determined according to the pixel-wise prediction mode of the current coding block.

9. The method according to claim 1, wherein the reconstructed pixel points surrounding the at least one pixel point comprise pixel points satisfying at least one of:
   pixel points in a square region with the at least one pixel point as a center and a side length being a first preset value; or
   pixel points in a diamond-shaped region with the at least one pixel point as a center and a diagonal length being a second preset value.

10. The method according to claim 1, wherein the information of the reconstructed pixel points comprises at least one of: pixel value, reconstruction residual value, gradient value, flatness information or texture information or complexity information, background luminance, contrast, or degree of motion.

11. The method according to claim 10, wherein a value of the information of the reconstructed pixel points comprises at least one of: original value, absolute value, mean value, or difference value.

12. The method according to claim 1, wherein the prediction mode of the current coding block is a block prediction mode, and the method further comprises:
   acquiring region partition information of the current coding block, wherein the region partition information comprises a number of regions N and position information of region boundary line, and N is an integer greater than or equal to 2; and
   partitioning the current coding block into N regions according to the region partition information, wherein acquiring region partition information of the current coding block comprises:
  acquiring predefined region partition information of the current coding block; or
  parsing a bit stream to acquire the region partition information of the current coding block.

13. A video codec system, comprising a decoding device, wherein the decoding device is configured to realize the method according to claim 1.

14. A non-transitory computer-readable storage medium, wherein a computer program or instruction is stored in the storage medium, and when the computer program or instruction is executed by an electronic device, the method according to claim 1 is realized.

15. A picture coding method, performed by a coding device, the picture coding method comprising:
  determining, for any at least one pixel point which indicates one pixel point or a plurality of parallel quantization pixel points in a current coding block, a quantization parameter (QP) value for the at least one pixel point, wherein at least two pixel points in the current coding block have different QP values;
  performing quantization on the at least one pixel point according to the QP value of the at least one pixel point;
  acquiring a OP value of the current coding block; and
  taking the OP value of the current coding block as a prediction QP value of the at least one pixel point,
  wherein determining the OP value of the at least one pixel point comprises:
    when the at least one pixel point indicates any one target pixel point or any plurality of parallel quantization target pixel points in the current coding block, adjusting the prediction QP value of the at least one pixel point, and taking the adjusted prediction OP value as the QP value of the at least one pixel point, and
  wherein adjusting the prediction OP value of the at least one pixel point comprises:
    acquiring information of reconstructed pixel points surrounding the at least one pixel point, and
    adjusting the prediction QP value of the at least one pixel point according to the information of the reconstructed pixel points surrounding the at least one pixel point.

16. The video codec system according to claim 13, further comprising a coding device, wherein the coding device is in communication connection with the decoding device, and the coding device is configured to realize the method according to claim 15.

17. An electronic device, comprising at least one processor and at least one memory, wherein the at least one memory is configured to store computer instructions, and the at least one processor is configured to call and run the computer instructions from the at least one memory and is configured to:
  determine, for any at least one pixel point which indicates one pixel point or a plurality of parallel dequantized pixel points in a current coding block, a quantization parameter (QP) value for the at least one pixel point, wherein at least two pixel points in the current coding block have different QP values;
  perform dequantization on the at least one pixel point according to the QP value of the at least one pixel point;
  acquire a OP value of the current coding block; and
  take the QP value of the current coding block as a prediction OP value of the at least one pixel point,
  wherein the at least one processor is configured to:
    when the at least one pixel point indicates any one target pixel point or any plurality of parallel dequantized target pixel points in the current coding block, adjust the prediction QP value of the at least one pixel point, and take the adjusted prediction OP value as the OP value of the at least one pixel point, and
  wherein the at least one processor is configured to:
    acquire information of reconstructed pixel points surrounding the at least one pixel point, and adjust the prediction OP value of the at least one pixel point according to the information of the reconstructed pixel points surrounding the at least one pixel point.

* * * * *